United States Patent
Hu et al.

(10) Patent No.: US 11,924,657 B2
(45) Date of Patent: Mar. 5, 2024

(54) METHOD, DEVICE, AND SYSTEM FOR DETERMINING MINIMIZATION OF DRIVE TESTS (MDT)

(71) Applicant: Huawei Technologies Co., Ltd., Shenzhen (CN)

(72) Inventors: Xingxing Hu, Shanghai (CN); Hongping Zhang, Shanghai (CN); Qinghai Zeng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 415 days.

(21) Appl. No.: 17/216,311

(22) Filed: Mar. 29, 2021

(65) Prior Publication Data
US 2021/0219156 A1    Jul. 15, 2021

Related U.S. Application Data
(63) Continuation of application No. PCT/CN2019/108765, filed on Sep. 27, 2019.

(30) Foreign Application Priority Data
Sep. 29, 2018  (CN) .......................... 201811151714.7

(51) Int. Cl.
H04W 24/08    (2009.01)
H04B 17/309   (2015.01)
H04W 24/10    (2009.01)

(52) U.S. Cl.
CPC .......... *H04W 24/08* (2013.01); *H04B 17/309* (2015.01); *H04W 24/10* (2013.01)

(58) Field of Classification Search
CPC ..... H04W 24/08; H04W 24/10; H04W 16/18; H04W 24/02; H04W 36/00;
(Continued)

(56) References Cited

U.S. PATENT DOCUMENTS
2011/0269402 A1* 11/2011 Yi .......................... H04W 24/08
                                                          455/67.11
2013/0114446 A1    5/2013 Liu et al.
(Continued)

FOREIGN PATENT DOCUMENTS
CN    102202284 A    9/2011
CN    103209424 A    7/2013
(Continued)

OTHER PUBLICATIONS
3GPP TS 32.422 V15.1.0 (Jun. 2018),3rd Generation Partnership Project;Technical Specification Group Services and System Aspects;Telecommunication management;Subscriber and equipment trace;Trace control and configuration management(Release 15), 189 pages.
(Continued)

*Primary Examiner* — Mewale A Ambaye
(74) *Attorney, Agent, or Firm* — Slater Matsil, LLP

(57) ABSTRACT

This application provides a minimization of drive tests (MDT) measurement solution, which may be used to implement an MDT measurement of a network device with an architecture in which a central unit (CU) entity and a distributed unit (DU) entity are separated. A centralized unit control plane (CU-CP) determines configuration information, and sends the configuration information to a centralized unit user plane (CU-UP) of the network device. The configuration information is used to perform an MDT measurement on a measurement object. The solution in this application may be applied to a communications system, for example, may be applied to a 5th generation (5G) network.

20 Claims, 10 Drawing Sheets

(58) Field of Classification Search
CPC ............. H04W 36/0083; H04B 17/309; H04B 17/373; H04L 43/00

See application file for complete search history.

(56) References Cited

U.S. PATENT DOCUMENTS

| | | | |
|---|---|---|---|
| 2022/0124560 A1* | 4/2022 | Yeh .................... | H04L 41/5054 |
| 2022/0232452 A1* | 7/2022 | Sivaraj .................. | H04W 76/11 |
| 2023/0199481 A1* | 6/2023 | Centonza ................ | H04W 8/30 |
| | | | 455/424 |

FOREIGN PATENT DOCUMENTS

| | | | | |
|---|---|---|---|---|
| CN | 105122865 | A | 12/2015 | |
| CN | 106162692 | A | 11/2016 | |
| CN | 108347751 | A | 7/2018 | |
| CN | 108401507 | A | 8/2018 | |
| CN | 110958633 | A | 4/2020 | |
| EP | 3860200 | A1 | 8/2021 | |
| WO | 2013072782 | A1 | 5/2013 | |
| WO | 2014025343 | A1 | 2/2014 | |
| WO | 2015147735 | A1 | 10/2015 | |
| WO | 2018030819 | A1 | 2/2018 | |
| WO | 2020067812 | A1 | 4/2020 | |
| WO | WO-2020067812 | A1 * | 4/2020 | ......... H04L 41/0803 |

OTHER PUBLICATIONS

3GPP TS 38.463 V15.1.0 (Sep. 2018), 3rd Generation Partnership Project; Technical Specification Group Radio Access Network; NG-RAN; E1 Application Protocol (E1AP)(Release 15), 152 pages.

3GPP TS 36.423 V15.3.0 (Sep. 2018),3rd Generation Partnership Project;Technical Specification Group Radio Access Network;Evolved Universal Terrestrial Radio Access Network(E-UTRAN);X2 application protocol (X2AP)(Release 15), 401 pages.

3GPP TS 38.473 V15.3.0 (Sep. 2018), 3rd Generation Partnership Project; Technical Specification Group Radio Access Network; NG-RAN; F1 application protocol (F1AP)(Release 15), 176 pages.

3GPP TS 37.320 V15.0.0 (Jun. 2018),3rd Generation Partnership Project;Technical Specification Group Radio Access Network;Universal Terrestrial Radio Access (UTRA) and Evolved Universal Terrestrial Radio Access (E-UTRA);Radio measurement collection for Minimization of Drive Tests (MDT); Overall description; Stage 2 (Release 15), 27 pages.

3GPP TS 38.401 V15.3.0 (Sep. 2018), 3rd Generation Partnership Project; Technical Specification Group Radio Access Network; NG-RAN; Architecture description(Release 15), 39 pages.

Huawei, "L2 Measurements for NG-RAN", 3GPP TSG-RAN3 Meeting #AH-1807, R3-184220, Jul. 2-6, 2018, 4 pages, Montreal, Canada.

3GPP TS 38.331 V15.3.0 (Sep. 2018), 3rd Generation Partnership Project; Technical Specification Group Radio Access Network; NR; Radio Resource Control (RRC) protocol specification(Release 15), 445 pages.

Yuan, Y. et al., "Discussion on CU-DU Architecture, Equipment implementation and Application in 5G", 2018, 6 pages.

Mondal, R. et al., "Performance Evaluation of MDT Assisted LTE RFFingerprint Framework", Seventh International Conference on Mobile Computing and Ubiquitous Networking (ICMU), 2014, 5 pages.

Zihua, C. et al., "Research on 5G C-RAN Network Based on CU-DU Separation Architecture", Zhongrui Communication Planning and Design Co., Ltd., May 13, 2017, 6 pages.

CATT, "Discussion on L2 measurements support in case of CU/DU split", 3GPP TSG RAN WG3 Meeting #96, R3-171457, May 15-19, 2017, 3 pages, Hangzhou, China.

Nokia, "CR R15 to TS 32422-fOO Add support for 5G Trace (NG-RAN—F1)", 3GPP TSG-SA5 Meeting #118, S5-182325, Apr. 9, 2018-Apr. 13, 2018, 9 pages, Beijing, China.

* cited by examiner

METHOD, DEVICE, AND SYSTEM FOR DETERMINING MINIMIZATION OF DRIVE TESTS (MDT)

CROSS-REFERENCE TO RELATED APPLICATIONS

This application is a continuation of International Application No. PCT/CN2019/108765, filed on Sep. 27, 2019, which claims priority to Chinese Patent Application No. 201811151714.7, filed on Sep. 29, 2018. The disclosures of the aforementioned applications are hereby incorporated by reference in their entireties.

TECHNICAL FIELD

This application relates to the field of communications technologies, and in particular, to a measurement method, a device, and a system.

BACKGROUND

To reduce data collection costs, a minimization of drive tests (MDT) technology in automatic measurement collection is introduced in a current technology to complete some conventional drive tests, so as to detect and optimize a problem or a fault in a wireless network. An application scenario of the MDT technology may include, for example, a scenario in which an operator generally performs a routine network coverage drive test every month, or a scenario in which some network coverage drive tests are performed on a specific area in response to a user complaint.

Currently, the MDT technology may be applied to automatic measurement collection for a base station, for example, quality of service (QoS) measurement collection, cell signal quality measurement collection, or accessibility measurement collection. However, for a base station with an architecture in which a central unit (CU) entity and a distributed unit (DU) entity are separated, there is currently no related solution to how to perform an MDT measurement.

SUMMARY

An MDT measurement solution provided in embodiments of this application may be used for an MDT measurement in a communications network for a network device with an architecture in which a CU and a DU are separated.

To achieve the foregoing objective, the following technical solutions are used in the embodiments of this application:

According to a first aspect, an MDT measurement method and a corresponding communications apparatus are provided. In this solution, a first entity determines first configuration information. The first configuration information is used by a centralized unit user plane CU-UP entity of a network device to perform an MDT measurement on a first measurement object. The first entity sends the first configuration information to the CU-UP entity. According to the solution, for a network device with an architecture in which a CU entity and a DU entity are separated, the MDT measurement may be performed by the CU-UP entity.

In a possible design, the first configuration information includes one or more of the following: the first measurement object, a granularity of the first measurement object, a first statistical period, or a manner of feeding back a first measurement collection result.

In a possible design, the MDT measurement method provided in this embodiment of this application further includes: The first entity receives the first measurement collection result. The first measurement collection result is obtained by the CU-UP entity by performing the MDT measurement on the first measurement object. According to the solution, for the network device with an architecture in which the CU entity and the DU entity are separated, the MDT measurement may be performed by the CU-UP entity, and the first entity may perform processing such as data analysis, optimization, or network performance monitoring based on the first measurement collection result.

In a possible design, the MDT measurement method provided in this embodiment of this application further includes: The first entity determines second configuration information. The second configuration information is used by the distributed unit DU entity of the network device to perform an MDT measurement on a second measurement object. The first entity sends the second configuration information to the DU entity. According to the solution, for the network device with an architecture in which the CU entity and the DU entity are separated, the MDT measurement may be performed by the DU entity.

In a possible design, the second configuration information includes one or more of the following: the second measurement object, a granularity of the second measurement object, a second statistical period, or a manner of feeding back a second measurement collection result.

In a possible design, the MDT measurement method provided in this embodiment of this application further includes: The first entity receives the second measurement collection result. The second measurement collection result is obtained by the DU entity by performing the MDT measurement on the second measurement object. According to the solution, for the network device with an architecture in which the CU entity and the DU entity are separated, the MDT measurement may be performed by the DU entity, and the first entity may perform processing such as data analysis, optimization, or network performance monitoring based on the second measurement collection result.

In a possible design, the first entity is a central unit control plane CU-CP entity of the network device. The MDT measurement method provided in this embodiment of this application further includes: The CU-CP entity sends third configuration information. The third configuration information is used by a terminal device to perform an MDT measurement on a third measurement object. The CU-CP entity receives a third measurement collection result. The third measurement collection result is obtained by the terminal device by performing the MDT measurement on the third measurement object. According to the solution, for the network device with an architecture in which the CU entity and the DU entity are separated, the MDT measurement may be performed by the terminal device, and the CU-CP entity may collect the third measurement collection result, and perform processing such as data analysis, optimization, or network performance monitoring based on the third measurement collection result.

In a possible design, the first entity is a central unit control plane CU-CP entity of the network device. The MDT measurement method provided in this embodiment of this application further includes: The CU-CP entity sends third configuration information. The third configuration information is used by a terminal device to perform an MDT measurement on a third measurement object. The CU-CP entity receives a third measurement collection result. The third measurement collection result is obtained by the terminal device by performing the MDT measurement on the third measurement object. The CU-CP entity sends the third measurement collection result to the CU-UP entity. According to the solution, for the network device with an architecture in which the CU entity and the DU entity are separated, the MDT measurement may be performed by the terminal device, and the CU-UP entity may collect the third measurement collection result, and perform processing such as data analysis, optimization, or network performance monitoring based on the third measurement collection result.

In a possible design, the first entity is an MDT entity. The MDT measurement method provided in this embodiment of this application further includes: The MDT entity determines third configuration information. The third configuration information is used by a terminal device to perform an MDT measurement on a third measurement object. The MDT entity sends the third configuration information to the CU-CP entity, and the CU-CP entity sends the third configuration information to the terminal device. According to the solution, for the network device with an architecture in which the CU entity and the DU entity are separated, the MDT measurement may be performed by the terminal device.

In a possible design, the MDT measurement method provided in this embodiment of this application further includes: The MDT entity receives the third measurement collection result. The third measurement collection result is obtained by the terminal device by performing the MDT measurement on the third measurement object. According to the solution, for the network device with an architecture in which the CU entity and the DU entity are separated, the MDT measurement may be performed by the terminal device, and the MDT entity may collect the third measurement collection result, and perform processing such as data analysis, optimization, or network performance monitoring based on the third measurement collection result. For example, the third configuration information includes one or more of the following: the third measurement object, a granularity of the third measurement object, a third statistical period, or a manner of feeding back the third measurement collection result.

According to a second aspect, a minimization of drive tests MDT measurement method and a corresponding communications apparatus are provided. The method is applied to a network device, and the network device includes a radio resource control RRC protocol layer and an MDT protocol layer. The MDT measurement method includes: The MDT protocol layer of the network device determines configuration information. The configuration information is used by at least one of an MDT protocol layer of a terminal device or an RRC protocol layer of the terminal device to perform an MDT measurement on a measurement object. The MDT protocol layer of the network device sends the configuration information to the MDT protocol layer of the terminal device. The configuration information reaches the MDT protocol layer of the terminal device through the MDT protocol layer of the network device, the RRC protocol layer of the network device, and the RRC protocol layer of the terminal device. According to the solution, the MDT measurement may be performed on the measurement object by at least one of the MDT protocol layer of the terminal device or the RRC protocol layer of the terminal device.

In a possible design, the configuration information is encapsulated in a first transmission container. The first transmission container is carried in a downlink RRC message for transmission between the RRC protocol layer of the network device and the RRC protocol layer of the terminal device. In a current technology, delivery of the configuration information during the MDT measurement is completed through exchanging RRC messages between the terminal device and the network device. Consequently, a protocol corresponding to the RRC message needs to be modified during MDT function evolution, and there is a strong dependency relationship between an MDT measurement function and an RRC function. However, in the MDT measurement method provided in this embodiment of this application, the MDT measurement function may be decoupled from the RRC function, thereby facilitating subsequent independent evolution of the MDT function.

In a possible design, the MDT measurement method provided in this embodiment of this application further includes: The MDT protocol layer of the network device receives a measurement collection result from the terminal device. The measurement collection result reaches the MDT protocol layer of the network device through the MDT protocol layer of the terminal device, the RRC protocol layer of the terminal device, and the RRC protocol layer of the network device. According to the solution, the MDT measurement may be performed by the terminal device, and the network device may collect the measurement collection result, and perform processing such as data analysis, optimization, or network performance monitoring based on the measurement collection result.

In a possible design, the measurement collection result is obtained by at least one of the MDT protocol layer of the terminal device or the RRC protocol layer of the terminal device by performing the MDT measurement on the measurement object.

In a possible design, the measurement collection result is encapsulated in a second transmission container, and the second transmission container is carried in an uplink RRC message for transmission between the RRC protocol layer of the terminal device and the RRC protocol layer of the network device. In a current technology, delivery of the configuration information during the MDT measurement is completed through exchanging RRC messages between the terminal device and the network device. Consequently, a protocol corresponding to the RRC message needs to be modified during MDT function evolution, and there is a strong dependency relationship between an MDT measurement function and an RRC function. However, in the MDT measurement method provided in this embodiment of this application, the MDT measurement function may be decoupled from the RRC function, thereby facilitating subsequent independent evolution of the MDT function.

According to a third aspect, a minimization of drive tests MDT measurement method and a corresponding communications apparatus are provided. The method is applied to a terminal device, and the terminal device includes an RRC protocol layer and an MDT protocol layer. The MDT measurement method includes: The MDT protocol layer of the terminal device receives configuration information from an MDT protocol layer of a network device. The configuration information reaches the MDT protocol layer of the terminal device through the MDT protocol layer of the network device, an RRC protocol layer of the network device, and the RRC protocol layer of the terminal device. At least one of the MDT protocol layer of the terminal device or the RRC protocol layer of the terminal device performs an MDT measurement on a measurement object based on the configuration information, to obtain a measurement collection result. According to the solution, the MDT measurement may be performed on the measurement object by at least one of the MDT protocol layer of the terminal device or the RRC protocol layer of the terminal device.

In a possible design, the configuration information is encapsulated in a first transmission container. The first transmission container is carried in a downlink RRC message for transmission between the RRC protocol layer of the network device and the RRC protocol layer of the terminal device. In a current technology, delivery of the configuration information during the MDT measurement is completed through exchanging RRC messages between the terminal device and the network device. Consequently, a protocol corresponding to the RRC message needs to be modified during MDT function evolution, and there is a strong dependency relationship between an MDT measurement function and an RRC function. However, in the MDT measurement method provided in this embodiment of this application, the MDT measurement function may be decoupled from the RRC function, thereby facilitating subsequent independent evolution of the MDT function.

In a possible design, the MDT measurement method provided in this embodiment of this application further includes: The MDT protocol layer of the terminal device sends the measurement collection result to the MDT protocol layer of the network device. The measurement result reaches the MDT protocol layer of the network device through the MDT protocol layer of the terminal device, the RRC protocol layer of the terminal device, and the RRC protocol layer of the network device. According to the solution, the MDT measurement may be performed by the terminal device, and the network device may collect the measurement collection result, and perform processing such as data analysis, optimization, or network performance monitoring based on the measurement collection result.

In a possible design, the measurement collection result is encapsulated in a second transmission container, and the second transmission container is carried in an uplink RRC message for transmission between the RRC protocol layer of the terminal device to the RRC protocol layer of the network device. In a current technology, delivery of the configuration information during the MDT measurement is completed through exchanging RRC messages between the terminal device and the network device. Consequently, a protocol corresponding to the RRC message needs to be modified during MDT function evolution, and there is a strong dependency relationship between an MDT measurement function and an RRC function. However, in the MDT measurement method provided in this embodiment of this application, the MDT measurement function may be decoupled from the RRC function, thereby facilitating subsequent independent evolution of the MDT function.

According to a fourth aspect, a minimization of drive tests MDT measurement method and a corresponding communications apparatus are provided. In the solution, a first network device determines that a second network device needs to perform an MDT measurement. The first network device sends a first message to the second network device. The first message is used to notify the second network device to perform an MDT measurement. According to the MDT measurement method provided in this embodiment of this application, the MDT measurement can be performed as required, so that a quantity of MDT measurements can be reduced.

According to a fifth aspect, a minimization of drive tests MDT measurement method and a corresponding communications apparatus are provided. The method includes: A second network device receives a first message from a first network device. The first message is used to notify the second network device to perform an MDT measurement. The second network device performs an MDT measurement based on the first message. Alternatively, the second network device notifies, based on the first message, a terminal device to perform an MDT measurement. According to the MDT measurement method provided in this embodiment of this application, the MDT measurement can be performed as required, so that a quantity of MDT measurements can be reduced.

According to a sixth aspect, a communications apparatus is provided, to implement the foregoing methods. The communications apparatus may be the first entity in the first aspect, or an apparatus including the first entity. Alternatively, the communications apparatus may be the network device in the second aspect, or an apparatus including the network device. Alternatively, the communications apparatus may be the terminal device in the third aspect, or an apparatus including the terminal device. Alternatively, the communications apparatus may be the first network device in the fourth aspect, or an apparatus including the first network device. Alternatively, the communications apparatus may be the second network device in the fifth aspect, or an apparatus including the second network device. The communications apparatus includes a corresponding module, unit, or means for implementing the foregoing methods. The module, unit, or means may be implemented by hardware or software, or implemented by hardware executing corresponding software. The hardware or the software includes one or more modules or units corresponding to the foregoing function.

According to a seventh aspect, a communications apparatus is provided. The communications apparatus includes a processor and a memory. The memory is configured to store a computer instruction, and when the processor executes the instruction, the communications apparatus is enabled to perform the method according to any one of the foregoing aspects. The communications apparatus may be the first entity in the first aspect, or an apparatus including the first entity. Alternatively, the communications apparatus may be the network device in the second aspect, or an apparatus including the network device. Alternatively, the communications apparatus may be the terminal device in the third aspect, or an apparatus including the terminal device. Alternatively, the communications apparatus may be the first network device in the fourth aspect, or an apparatus including the first network device. Alternatively, the communications apparatus may be the second network device in the fifth aspect, or an apparatus including the second network device.

The first entity may be, for example, a network device (for example, a base station) or a component (for example, a CU-CP entity, a CU-UP entity, a DU entity, an MDT entity, or a chip in a base station) in a network device.

According to an eighth aspect, a computer-readable storage medium is provided. The computer-readable storage medium stores an instruction, and when the instruction is run on a computer, the computer is enabled to perform the method according to any one of the foregoing aspects.

According to a ninth aspect, a computer program product including an instruction is provided. When the computer program product is run on a computer, the computer is enabled to perform the method according to any one of the foregoing aspects.

According to a tenth aspect, a communications apparatus (for example, the communications apparatus may be a chip or a chip system) is provided. The communications apparatus includes a processor, configured to implement the function in any one of the foregoing aspects. In a possible design, the communications apparatus further includes a memory. The memory is configured to store a program instruction and data that are necessary. When the communications apparatus is a chip system, the communications apparatus may include a chip, or may include a chip and another discrete component.

For technical effects brought by any design in the sixth aspect to the tenth aspect, refer to the technical effects brought by different designs in any one of the first aspect to the fifth aspect. Details are not described herein again.

According to an eleventh aspect, a communications system is provided. The communications system includes the terminal device in the foregoing aspect and the network device in the foregoing aspect.

DETAILED DESCRIPTION OF ILLUSTRATIVE EMBODIMENTS

For ease of understanding of technical solutions in embodiments of this application, the following first briefly describes technologies or names related to this application.

A network device is also referred to as a radio access network (RAN) device, and is a device that connects a terminal device to a wireless network. The network device may be an evolved NodeB (eNB or eNodeB) in long term evolution (LTE), a base station in a 5th generation (5G) network or a future evolved public land mobile network (PLMN), a broadband network gateway (BNG), an aggregation switch or a non-3rd generation partnership project (3GPP) access device, or the like. This is not specifically limited in the embodiments of this application. The base station in the embodiments of this application may include base stations in various forms, for example, a macro base station, a micro base station (which is also referred to as a small cell), a relay station, and an access point. This is not specifically limited in the embodiments of this application. The network device may alternatively be a server, a wearable device, a vehicle-mounted device, or the like. The following uses an example in which the network device is a base station for description.

Figure 1:
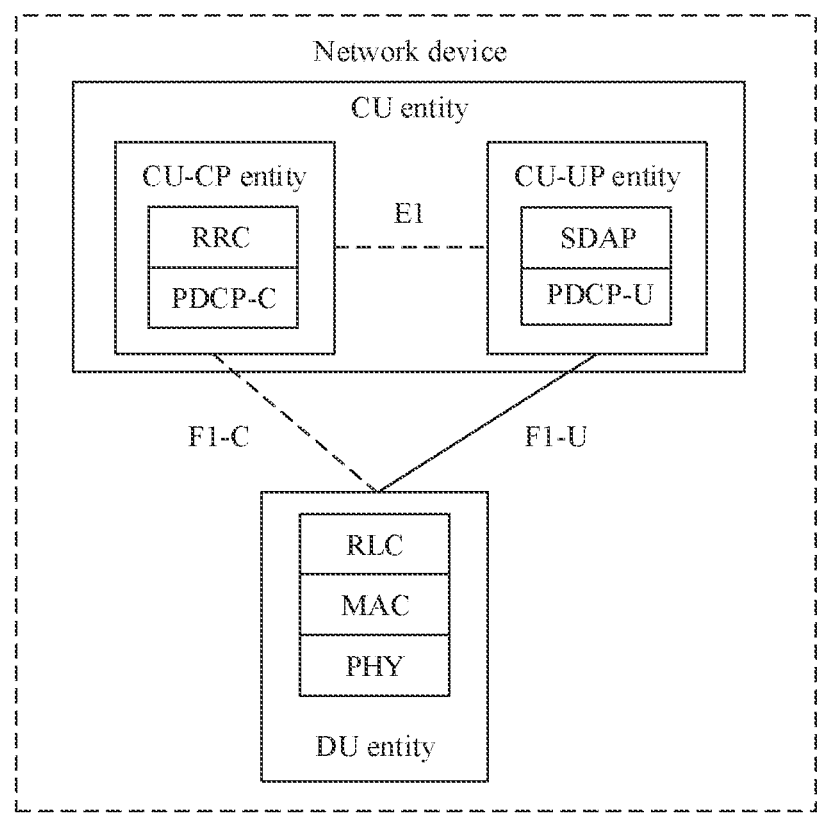
FIG. 1 is a schematic structural diagram of a communications system according to an embodiment of this application.

In a possible manner, the network device may use an architecture in which a CU entity and a DU entity are separated. For example, FIG. 1 is a schematic diagram of a protocol stack of a network device with an architecture in which a CU entity and a DU entity are separated according to this application. The CU entity and the DU entity may be understood as division of the network device from a perspective of logical functions, and the CU entity and the DU entity are respectively configured to implement functions of a CU and a DU. In this application, an entity may be a physical entity, or may be a functional entity. For example, the CU entity and the DU entity may be understood as devices or physical entities in devices, or may be functional entities. This is not specifically limited in the embodiments of this application. The CU entity and the DU entity may be physically separated, or may be deployed together. A plurality of DU entities may share one CU entity. One DU entity may alternatively be connected to a plurality of CU entities (not shown in FIG. 1). The CU entity and the DU entity may be connected through an interface, for example, an F1 interface. Division may be performed based on protocol layers of the wireless network for the CU entity and the DU entity. For example, functions of a radio resource control (RRC) protocol layer, a service data adaptation protocol (SDAP) stack protocol layer, and a packet data convergence protocol (PDCP) protocol layer are set on the CU entity, and functions of a radio link control (RLC) protocol layer, a media access control (MAC) protocol layer, and a physical (PHY) protocol layer are set on the DU entity. It may be understood that division of processing functions of the CU entity and the DU entity based on protocol layers is merely an example, and the processing functions of the CU entity and the DU entity may also be divided in another manner. For example, the CU entity or the DU entity may have functions of more protocol layers through division. For example, the CU entity or the DU entity may further have a part of processing function of a protocol layer through division. In a possible design, some functions of the RLC protocol layer and functions of a protocol layer above the RLC protocol layer are set on the CU entity, and remaining functions of the RLC protocol layer and functions of a protocol layer below the RLC protocol layer are set on the DU entity. In another possible design, functions of the CU entity or the DU entity may also be divided based on a service type or another system requirement. For example, division is performed based on a latency. A function whose processing time needs to meet a latency requirement is set on the DU entity, and a function whose processing time does not need to meet the latency requirement is set on the CU entity. In another possible design, the CU entity may alternatively have one or more functions of a core network. One or more CU entities may be disposed together, or may be disposed separately. For example, the CU entities may be disposed on a network side for centralized management. The DU entity may have a plurality of radio frequency functions, or a radio frequency function may be disposed remotely.

A function of the CU entity may be implemented by one or more entities. For example, functions of the CU entity may be further divided. For example, a function of a control plane (CP) may be separated from a function of a user plane (UP), that is, the CU entity includes a CU control plane (CU-CP) entity and a CU user plane (CU-UP) entity. The CU-CP entity and the CU-UP entity may be coupled to the DU entity, to jointly complete functions of the network device. In a possible manner, the CU-CP entity is responsible for a control plane function, and mainly includes the RRC protocol layer and a PDCP control plane (PDCP-C) protocol layer. The PDCP-C protocol layer is mainly responsible for data encryption and decryption, integrity protection, data transmission, and the like on the control plane. The CU-UP entity is responsible for a user plane function, and mainly includes the SDAP protocol layer and a PDCP user plane (PDCP-U) protocol layer. The SDAP protocol layer is mainly responsible for mapping a data flow on the core network to a bearer. The PDCP-U protocol layer is mainly responsible for encryption and decryption, integrity protection, header compression, serial number maintenance, data transmission, and the like on a data plane. In the embodiments of this application, the CU-CP entity and the CU-UP entity are connected through an interface (for example, an E interface). The CU-CP entity is connected to the DU entity through F1-C (control plane), and the CU-UP entity is connected to the DU entity through F1-U (user plane). In addition, the CU-CP entity represents the network device to connect to a control plane (for example, a mobility management entity (MME) of a 4th generation (4G) core network, or an access mobility management function (AMF) network element of a 5G core network (5G core, 5GC)) of the core network. The CU-UP entity represents the network device to connect to a user plane (for example, a serving gateway (SGW) of the 4G core network, or a user plane function (UPF) network element of the 5G core network) of the core network. The DU entity represents the network device to connect to a terminal device. In still another possible implementation, the PDCP-C is also on the CU-UP entity. This is not specifically limited in the embodiments of this application.

An MDT technology: Measurement types of the MDT technology may be classified into the following types:

First, a signal level measurement: The terminal device measures a signal level of a radio signal, for example, reference signal received power (RSRP) or reference signal received quality (RSRQ), and reports a measurement collection result to the network device.

Second, a QoS measurement: Generally, the network device performs the QoS measurement. For example, the network device performs a measurement on traffic of a service, an internet protocol (IP) throughput of a service, a packet loss rate of a service, or a processing latency of a service. Certainly, the QoS measurement may alternatively be performed by the terminal device. For example, the terminal device performs a measurement on an uplink processing latency. This is not specifically limited in the embodiments of this application.

Third, an accessibility measurement: The terminal device records information such as statistics on random access channel (RACH) failures, statistics on radio link failures (RLF), and statistics on RRC connection access failures, and reports the information to the network device.

All of the foregoing three types of measurement may be performed by the network device to collect the measurement collection result. After collecting the measurement collection result, the network device may perform self-optimization (SON) to optimize a network, for example, automatically optimize some parameters of the network. This is not specifically limited in the embodiments of this application.

Alternatively, the network device may collect the measurement collection result and transmit the measurement collection result to another entity. The another entity performs related processing, for example, network performance monitoring. This is not specifically limited in the embodiments of this application.

A QoS flow: The 5GC uses a QoS flow-based QoS architecture. A QoS flow refers to a service flow with a same service processing feature (for example, a scheduling policy and a queue management policy). A minimum granularity of service classification in the 5GC is a QoS flow. The 5GC allocates a QoS flow identifier (QFI) to each QoS flow for the network device. The terminal device and the network device have a protocol data unit (PDU) session connection to provide a data service. Corresponding data packets of a PDU session are distinguished by a quality of service flow (QoS flow) granularity (in other words, one PDU session may include a plurality of QoS flows). To adapt to an architecture of a QoS flow in the 5GC, as shown in FIG. 1, the service data adaptation protocol (SDAP) layer is introduced on the network device side. The SDAP protocol layer is used to map each quality of service flow (QoS flow) from the 5GC to a data radio bearer (DRB) at a radio access layer. To be specific, a data packet corresponding to a QoS flow is transmitted on a corresponding DRB based on a service attribute corresponding to the QoS flow. In addition, the SDAP protocol layer may further be responsible for adding QoS flow identifiers to an uplink data packet and a downlink data packet. The terminal device and the network device perform transmission through a radio bearer (RB). The RB is classified into a signaling radio bearer (SRB) and the DRB. The SRB may be used to transmit an RRC message and a non-access stratum (NAS) message. The DRB may be used to transmit service data. The RRC message is some control signaling between the terminal device and the network device, and the NAS message is some control signaling between a 5GC device and the terminal device. Each PDU session corresponds to one SDAP entity. QoS flows of different PDU sessions are mapped to different DRBs. In addition, different services have different quality of service characteristics. Some standard quality of service characteristics are defined in a standard. In other words, different combinations are defined for levels of quality of service characteristics (a priority, a packet latency requirement, a packet loss rate, or the like). In addition, one 5G QoS identifier (5QI) is defined for these standard combinations to index these feature requirements. For details, refer to the 3GPP 23.501 protocol. Details are not described herein.

The following describes the technical solutions in the embodiments of this application with reference to the accompanying drawings in the embodiments of this application. In the description of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more than two. "At least one item (piece) of the following" or a similar expression thereof means any combination of these items, including a singular item (piece) or any combination of plural items (pieces). For example, at least one of a, b, or c may indicate: a, b, c; a and b; a and c; b and c; or a, b, and c; where a, b, and c may be singular or plural. In addition, for convenience of clear description of the technical solutions in the embodiments of this application, in the embodiments of this application, terms such as "first", "second", and the like are used to distinguish same objects or similar objects whose functions and purposes are basically the same. A person skilled in the art may understand that the terms such as "first" and "second" do not limit a quantity or an execution sequence, and the terms such as "first" and "second" do not indicate a definite difference.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that as network architectures evolve and new service scenarios emerge, the technical solutions provided in the embodiments of this application are also applicable to similar technical problems.

Figure 2:
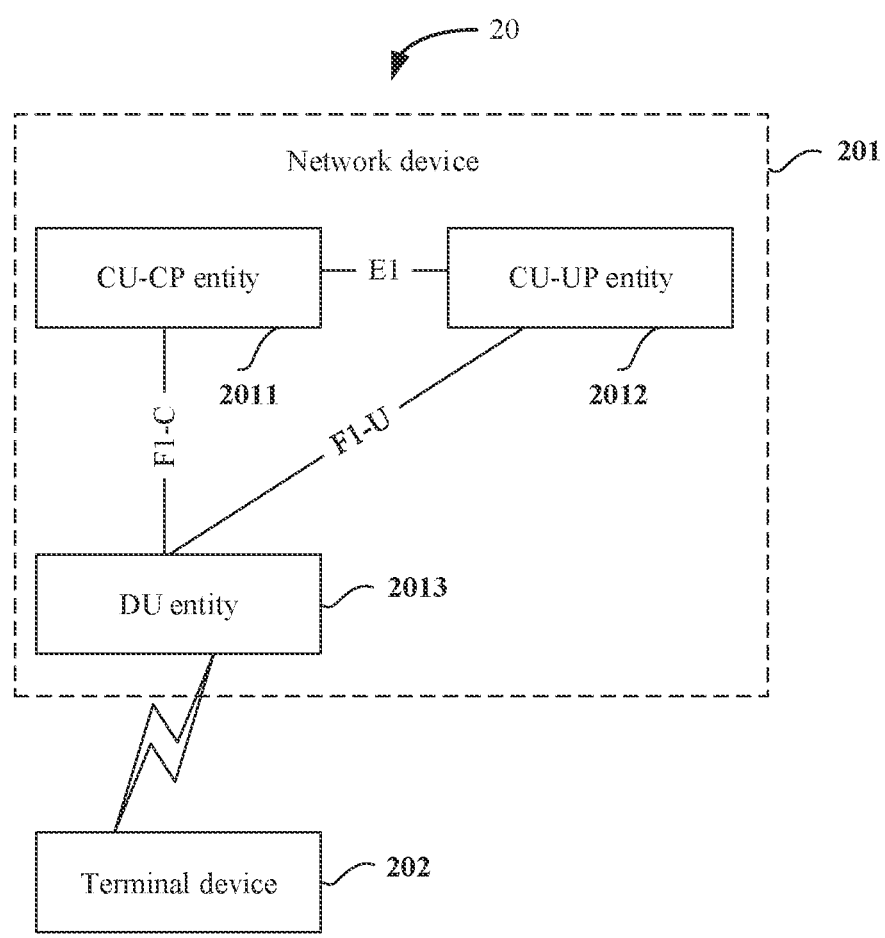
FIG. 2 is a schematic architectural diagram 1 of a communications system according to an embodiment of this application.

FIG. 2 shows a communications system 20 according to an embodiment of this application. The communications system 20 includes at least one network device (that a network device 201 is included is used as an example for description in FIG. 2), and at least one terminal device connected to the network device 201 (that a terminal device 202 is included is used an example for description in FIG. 2).

The network device 201 shown in FIG. 2 includes a CU-CP entity 2011, a CU-UP entity 2012, and a DU entity 2013. For related descriptions, refer to the embodiment shown in FIG. 1. Details are not described herein again. In addition, as described above, the DU entity 2013 of the network device 201 represents the network device 201 to connect to the terminal device 202, and the connection may be, for example, wireless communication. This is not specifically limited in this embodiment of this application.

The terminal device may be a device configured to implement a wireless communication function, for example, a terminal or a chip that can be used in a terminal. This is not specifically limited in this embodiment of this application. The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or in a fixed position.

Figure 3:
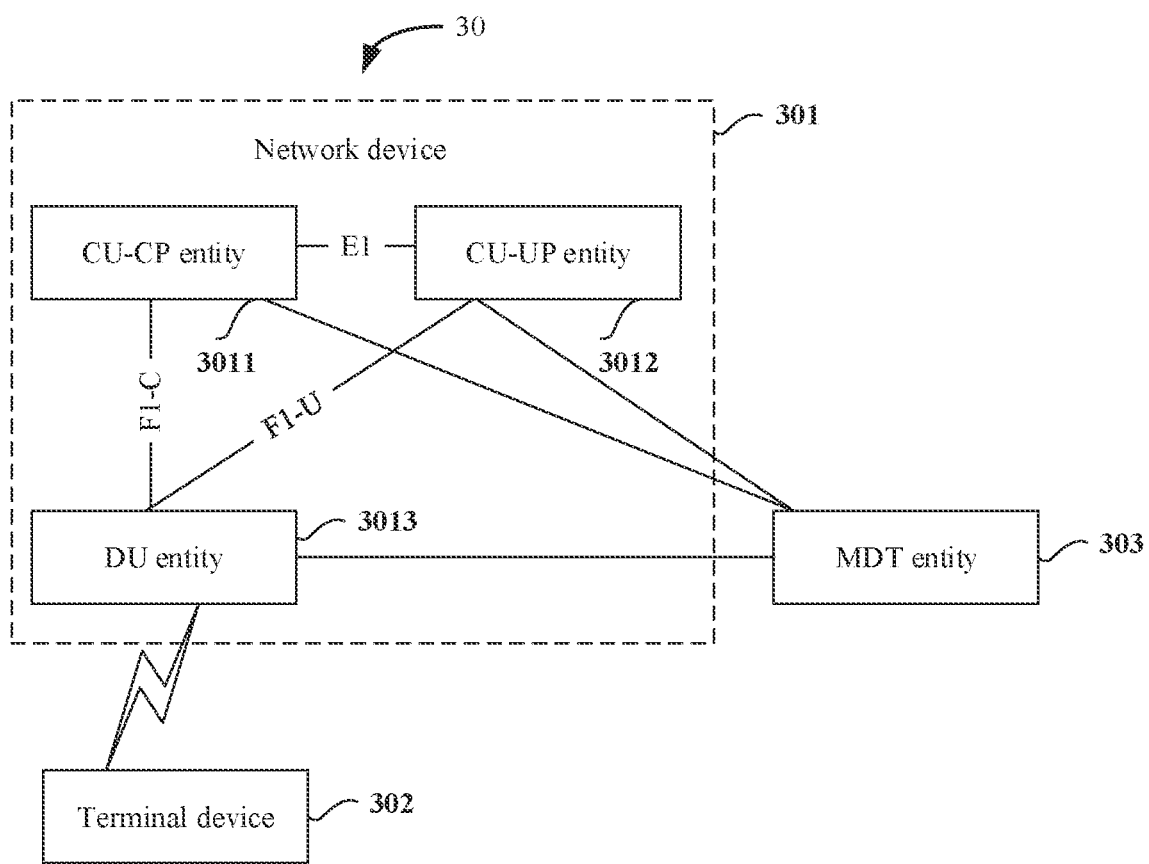
FIG. 3 is a schematic architectural diagram 2 of a communications system according to an embodiment of this application.

FIG. 3 shows a communications system 30 according to an embodiment of this application. The communications system 30 includes at least one network device (that a network device 301 is included is used as an example for description in FIG. 3) and at least one terminal device connected to the network device 301 (that a terminal device 302 is included is used an example for description in FIG. 3).

The network device 301 shown in FIG. 3 includes a CU-CP entity 3011, a CU-UP entity 3012, and a DU entity 3013. For related descriptions, refer to the embodiment shown in FIG. 1. Details are not described herein again. In addition, as described above, the DU entity 3013 of the network device 301 represents the network device 301 to connect to the terminal device 302, and the connection may be, for example, wireless communication. This is not specifically limited in this embodiment of this application.

In addition, as shown in FIG. 3, the communications system 30 may further include an MDT entity 303. The MDT entity may communicate with the CU-CP entity 3011, the CU-UP entity 3012, or the DU entity 3013. This is not specifically limited in this embodiment of this application.

It should be noted that the MDT entity in this application is a network function entity having an MDT measurement function. Optionally, the MDT entity may be responsible for functions such as delivering an MDT measurement configuration or collecting a measurement collection result, and may be responsible for parameter adjustment for some network side devices. However, the MDT entity is not responsible for delivering an initial parameter and other network deployment configurations to the network side device.

Figure 4:
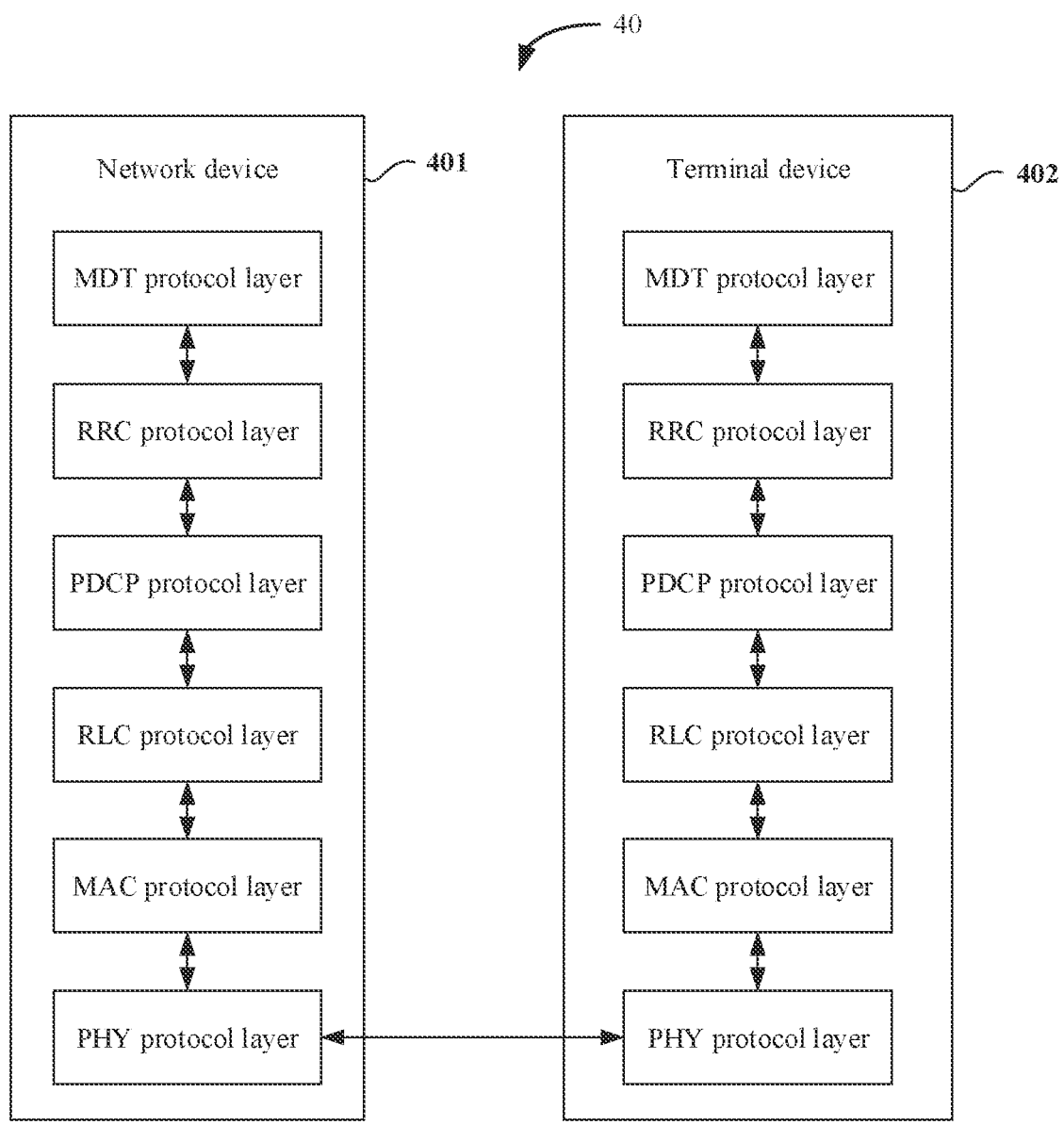
FIG. 4 is a schematic architectural diagram 3 of a communications system according to an embodiment of this application.

FIG. 4 shows a communications system 40 according to an embodiment of this application. The communications system 40 includes at least one network device (that a network device 401 is included is used as an example for description in FIG. 4) and at least one terminal device connected to the network device 401 (that a terminal device 402 is included is used an example for description in FIG. 4).

The network device 401 shown in FIG. 4 may use the architecture shown in FIG. 1 in which a CU entity and a DU entity are separated, or may not use the architecture shown in FIG. 1 in which a CU entity and a DU entity are separated. This is not specifically limited in this embodiment of this application. As shown in FIG. 4, protocol layers of the network device 401 include an MDT protocol layer, an RRC protocol layer, a PDCP protocol layer, an RLC protocol layer, a MAC protocol layer, and a PHY protocol layer. Protocol layers of the terminal device 402 include an MDT protocol layer, an RRC protocol layer, a PDCP protocol layer, an RLC protocol layer, a MAC protocol layer, and a PHY protocol layer. In this embodiment of this application, the MDT protocol layer is introduced above the RRC protocol layer. The MDT protocol layer is responsible for a configuration of an MDT measurement and/or collection of an MDT measurement. Specific implementation is described in detail in the following method embodiment, and details are not described herein.

Figure 5:
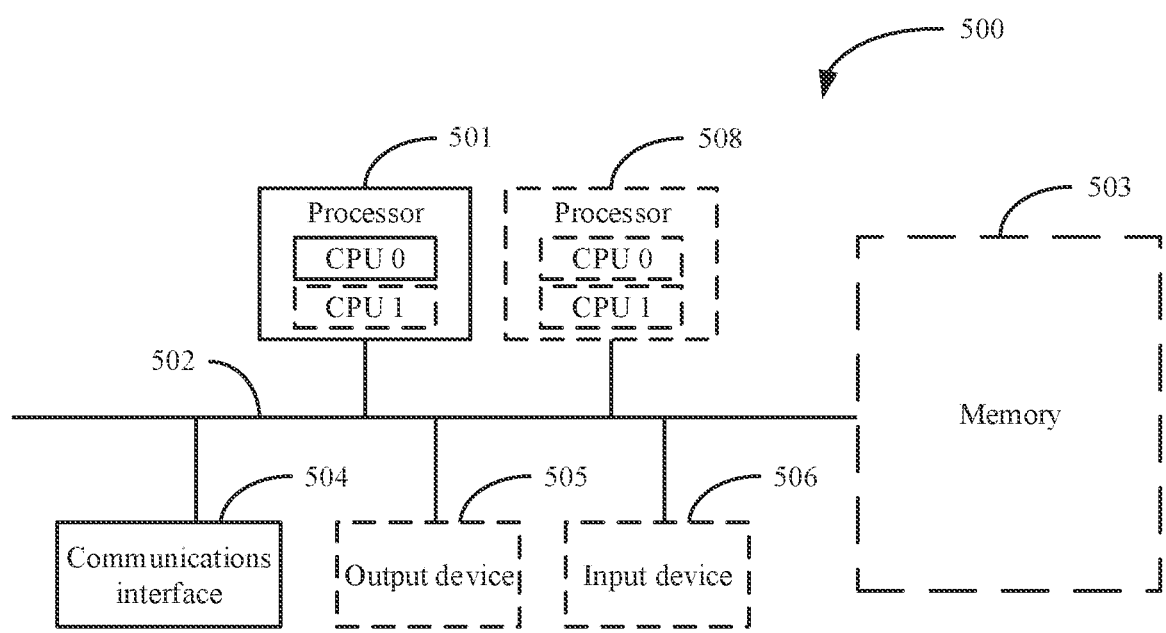
FIG. 5 is a schematic structural diagram of a communications device according to an embodiment of this application.

Optionally, in this embodiment of this application, a related function of the CU-CP entity 2011 in FIG. 2, the MDT entity 303 in FIG. 3, or the network device 401 or the terminal device 402 in FIG. 4 may be implemented by one device, or may be jointly implemented by a plurality of devices, or may be implemented by one or more functional modules in a device. This is not specifically limited in this embodiment of this application. It can be understood that the foregoing function may be a function of a network element on a hardware device, or may be a software function run on dedicated hardware, or may be a function of a combination of hardware and software, or may be a virtualization function instantiated on a platform (for example, a cloud platform). For example, in this embodiment of this application, the CU-CP entity 2011 in FIG. 2, the MDT entity 303 in FIG. 3, or the network device 401 or the terminal device 402 in FIG. 4 may be implemented by using a communications device (or a communications apparatus) 500 in FIG. 5. FIG. 5 is a schematic structural diagram of the communications device 500 according to an embodiment of this application. The communications device 500 includes one or more processors 501, a communication line 502, and at least one communications interface (that a communications interface 504 and one processor 501 are included is merely an example for description in FIG. 5). Optionally, the communications device 500 may further include a memory 503.

The processor 501 may be a general-purpose central processing unit (CPU), a microprocessor, an application-specific integrated circuit (ASIC), or one or more integrated circuits configured to control program execution of the solutions of this application.

The communication line 502 may include a channel, configured to connect different components.

The communications interface 504 may be a transceiver module, configured to communicate with another device or a communications network, for example, an Ethernet, a radio access network (RAN), or a wireless local area network (WLAN). For example, the transceiver module may be an apparatus such as a transceiver or a transceiver component. Optionally, the communications interface 504 may alternatively be a transceiver circuit located inside the processor 501, and is configured to implement signal input and signal output of the processor.

The memory 503 may be an apparatus having a storage function. For example, the memory 503 may be a read-only memory (ROM) or another type of static storage device that can store static information and an instruction, or a random access memory (RAM) or another type of dynamic storage device that can store information and an instruction. The memory 503 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 503 is not limited thereto. The memory may exist independently, and is connected to the processor through the communication line 502. Alternatively, the memory may be integrated with the processor.

The memory 503 is configured to store a computer-executable instruction for performing the solutions in this application, and the processor 501 controls execution of the computer-executable instruction. The processor 501 is configured to execute the computer-executable instruction stored in the memory 503, to implement an MDT measurement method provided in the embodiments of this application.

Alternatively, optionally, in this embodiment of this application, the processor 501 may perform processing related functions in the MDT measurement method provided in the following embodiments of this application, and the communications interface 504 is responsible for communication with another device or a communications network. This is not specifically limited in this embodiment of this application.

Optionally, the computer-executable instruction in the embodiments of this application may also be referred to as application program code. This is not specifically limited in this embodiment of this application.

During specific implementation, in an embodiment, the processor 501 may include one or more CPUs, for example, a CPU 0 and a CPU 1 in FIG. 5.

During specific implementation, in an embodiment, the communications device 500 may include a plurality of processors, for example, the processor 501 and a processor 508 in FIG. 5. Each of the processors may be a single-core (single-CPU) processor, or may be a multi-core (multi-CPU) processor. The processor herein may refer to one or more devices, circuits, and/or processing cores configured to process data (for example, a computer program instruction).

During specific implementation, in an embodiment, the communications device 500 may further include an output device 505 and an input device 506. The output device 505 communicates with the processor 501, and may display information in a plurality of manners. For example, the output device 505 may be a liquid crystal display (LCD), a light emitting diode (LED) display device, a cathode ray tube (CRT) display device, or a projector. The input device 506 communicates with the processor 501, and may receive an input from a user in a plurality of manners. For example, the input device 506 may be a mouse, a keyboard, a touchscreen device, a sensor device, or the like.

The communications device 500 sometimes may also be referred to as a communications apparatus, and may be a general-purpose device or a dedicated device. For example, the communications device 500 may be a desktop computer, a portable computer, a network server, a personal digital assistant (PDA), a mobile phone, a tablet computer, a wireless terminal device, an embedded device, the foregoing terminal device, the foregoing network device, or a device with a structure similar to a structure shown in FIG. 5. A type of the communications device 500 is not limited in this embodiment of this application.

The following describes in detail the MDT measurement method provided in the embodiments of this application with reference to FIG. 1 to FIG. 5.

It should be noted that in the following embodiments of this application, names of messages between network elements, names of parameters in messages, or the like are merely examples, and there may be other names in specific implementation. This is not specifically limited in this embodiment of this application.

Figure 6:
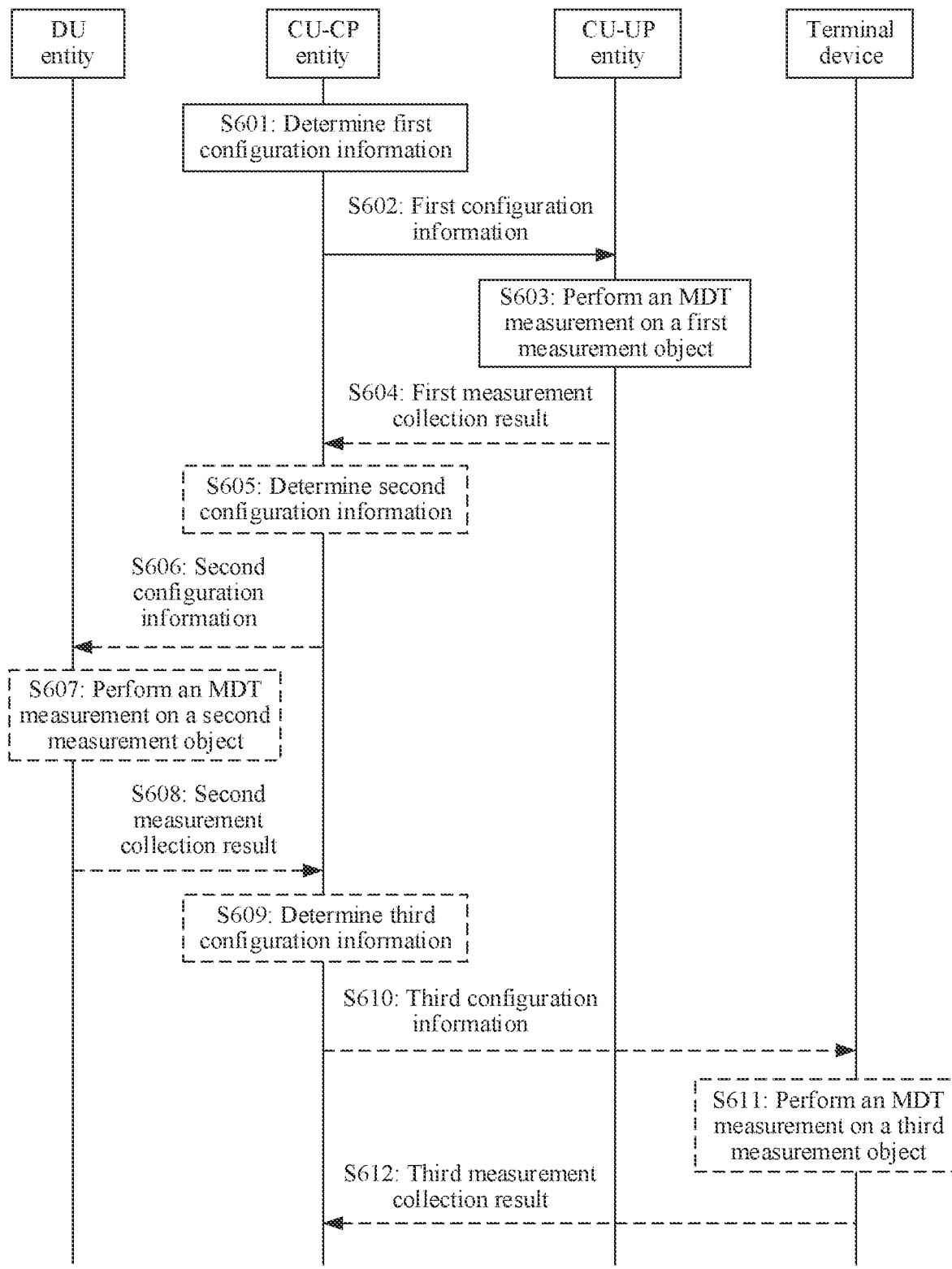
FIG. 6 is a schematic flowchart 1 of an MDT measurement method according to an embodiment of this application.

An example in which the MDT measurement method provided in the embodiments of this application is applied to the communications system shown in FIG. 2 is used. FIG. 6 shows an MDT measurement method according to an embodiment of this application. The MDT measurement method includes the following steps.

S601: A CU-CP entity of a network device determines first configuration information, where the first configuration information is used by a CU-UP entity of the network device to perform an MDT measurement on a first measurement object.

Optionally, the first configuration information in this embodiment of this application may include, for example, one or more of the following: the first measurement object, a granularity of the first measurement object, a first statistical period, or a manner of feeding back a first measurement collection result.

For example, it is assumed that the first measurement object is pre-agreed on or pre-configured by the CU-CP entity and the CU-UP entity, or specified in a protocol. In this case, the first configuration information may include, for example, the granularity of the first measurement object, the first statistical period, or the manner of feeding back the first measurement collection result. Alternatively, the first configuration information includes the granularity of the first measurement object and the first statistical period. Alternatively, the first configuration information includes the granularity of the first measurement object and the manner of feeding back the first measurement collection result. Alternatively, the first configuration information includes the manner of feeding back the first measurement collection result and the first statistical period. Alternatively, the first configuration information includes the granularity of the first measurement object, the first statistical period, and the manner of feeding back the first measurement collection result.

For another example, it is assumed that the granularity of the first measurement object is pre-agreed on or pre-configured by the CU-CP entity and the CU-UP entity, or specified in a protocol. In this case, the first configuration information may include, for example, the first measurement object. Alternatively, the first configuration information includes the first measurement object and the first statistical period. Alternatively, the first configuration information includes the first measurement object and the manner of feeding back the first measurement collection result. Alternatively, the first configuration information includes the first measurement object, the first statistical period, and the manner of feeding back the first measurement collection result.

For still another example, it is assumed that the first statistical period is pre-agreed on or pre-configured by the CU-CP entity and the CU-UP entity, or specified in a protocol. In this case, the first configuration information may include, for example, the first measurement object. Alternatively, the first configuration information includes the granularity of a first measurement object and the first measurement object. Alternatively, the first configuration information includes the first measurement object and the manner of feeding back the first measurement collection result. Alternatively, the first configuration information includes the first measurement object, the granularity of the first measurement object, and the manner of feeding back the first measurement collection result.

For still yet another example, it is assumed that the manner of feeding back the first measurement collection result is pre-agreed on or pre-configured by the CU-CP entity and the CU-UP entity, or specified in a protocol. In this case, the first configuration information may include, for example, the first measurement object. Alternatively, the first configuration information includes the granularity of the first measurement object and the first measurement object. Alternatively, the first configuration information includes the first measurement object and the first statistical period. Alternatively, the first configuration information includes the first measurement object, the granularity of the first measurement object, and the first statistical period.

For a further example, it is assumed that the first statistical period and the manner of feeding back the first measurement collection result are pre-agreed on or pre-configured by the CU-CP entity and the CU-UP entity, or specified in a protocol. In this case, the first configuration information may include, for example, the first measurement object. Alternatively, the first configuration information includes the first measurement object and the granularity of the first measurement object.

For a still further example, it is assumed that the granularity of the first measurement object, the first statistical period, and the manner of feeding back the first measurement collection result are pre-agreed on or pre-configured by the CU-CP entity and the CU-UP entity, or specified in a protocol. In this case, the first configuration information may include, for example, the first measurement object.

The foregoing example is merely an example of some possible combinations for the first configuration information. Alternatively, the first configuration information may have another combination of one or more of the first measurement object, the granularity of the first measurement object, the first statistical period, and the manner of feeding back the first measurement collection result. Examples are not described one by one herein in this embodiment of this application.

Optionally, in this embodiment of this application, the first measurement object may be, for example, traffic of a service, an IP throughput of a service, a packet loss rate of a service, or a processing latency of a service. A type of a service is not specifically limited in this embodiment of this application.

Optionally, in this embodiment of this application, the traffic of a service, the IP throughput of a service, the packet loss rate of a service, or the processing latency of a service may be further distinguished for uplink and downlink. For example, the traffic of a service includes at least one of uplink traffic of the service or downlink traffic of the service. Alternatively, the IP throughput of a service includes at least one of an uplink IP throughput of the service or a downlink IP throughput of the service. Alternatively, the packet loss rate of a service includes at least one of an uplink packet loss rate of the service or a downlink packet loss rate of the service. Alternatively, the processing latency of a service includes at least one of an uplink processing latency of the service or a downlink processing latency of the service. This is not specifically limited in this embodiment of this application.

Optionally, in this embodiment of this application, the granularity of the first measurement object may be, for example, a QoS flow granularity, a 5QI granularity, or a DRB granularity. This is not specifically limited in this embodiment of this application.

Optionally, in this embodiment of this application, the first statistical period is a period that the CU-UP entity performs the MDT measurement on the first measurement object.

Optionally, in this embodiment of this application, for example, the manner of feeding back the first measurement collection result may be that the CU-UP entity feeds back the first measurement collection result to the CU-CP entity through a user plane between the CU-UP entity and the CU-CP entity. Alternatively, for example, the manner of feeding back the first measurement collection result may be that the CU-UP entity feeds back the first measurement collection result to the CU-CP entity through a control plane between the CU-UP entity and the CU-CP entity. This is not specifically limited in this embodiment of this application.

Optionally, in this embodiment of this application, if the manner of feeding back the first measurement collection result is that the CU-UP entity feeds back the first measurement collection result to the CU-CP entity through the user plane between the CU-UP entity and the CU-CP entity, the first configuration information in this embodiment of this application may further include corresponding tunnel information. The tunnel information is used by the CU-UP entity to feed back the first measurement collection result to the CU-CP entity. The tunnel information may be, for example, general packet radio service (GPRS) tunnelling protocol user plane (GPRS tunnelling protocol user plane, GTP-U)

tunnel information. This is not specifically limited in this embodiment of this application.

Optionally, in this embodiment of this application, the first configuration information may further include configuration information of a trigger event that the CU-UP entity reports the first measurement collection result, and the configuration information of the trigger event may include, for example, a trigger threshold. For example, when a measurement result of the processing latency of the service is lower than the trigger threshold, the CU-UP entity reports the corresponding first measurement collection result or reports an event to the CU-CP entity. This is not specifically limited in this embodiment of this application.

S602: The CU-CP entity sends the first configuration information to the CU-UP entity. Correspondingly, the CU-UP entity receives the first configuration information from the CU-CP entity.

For example, the CU-CP entity may send the first configuration information to the CU-UP entity through a message of the E1 interface shown in FIG. 2, and the CU-UP entity may receive the first configuration information from the CU-CP entity through a message of the E1 interface shown in FIG. 2. In this embodiment of this application, the message of the E1 interface may be an improvement on an existing message, or may be a newly defined message. This is not specifically limited in this embodiment of this application.

S603: The CU-UP entity performs the MDT measurement on the first measurement object based on the first configuration information, to obtain the first measurement collection result.

It should be noted that the measurement collection result (for example, the first measurement collection result, a second measurement collection result, or a third measurement collection result) in this embodiment of this application may also be referred to as a measurement result or a collection result. A name of the measurement collection result is not specifically limited in this embodiment of this application. The measurement collection result, the measurement result, or the collection result may be obtained after one or more of a measurement or collection is performed. This is not specifically limited in this embodiment of this application.

The MDT measurement in this embodiment of this application may include a measurement or collection. A general description is provided herein, and this embodiment of this application imposes no specific limitation.

Optionally, in this embodiment of this application, the CU-UP entity may perform the corresponding MDT measurement based on at least one of the first measurement object, the granularity of the first measurement object, or the first statistical period in the first configuration information.

Optionally, in this embodiment of this application, the first measurement collection result may be, for example, a statistical result of traffic of the service, a statistical result of the IP throughput of the service, a statistical result of the packet loss rate of the service, or a statistical result of the processing latency of the service. The corresponding statistical result may be specific measured values, or may be a distribution corresponding to specific measured values. This is not specifically limited in this embodiment of this application.

Optionally, in this embodiment of this application, after obtaining the first measurement collection result, the CU-UP entity may perform related data analysis on the first measurement collection result, and then perform SON to optimize a network, for example, automatically optimize some parameters of the network. This is not specifically limited in this embodiment of this application. Alternatively, the CU-UP entity may perform network performance monitoring after collecting the first measurement collection result. Alternatively, after collecting the first measurement collection result, the CU-UP entity may send the first measurement collection result to another entity, and the another entity performs network performance monitoring. This is not specifically limited in this embodiment of this application.

According to the foregoing steps S601 to S603, for the network device with an architecture in which a CU entity and a DU entity are separated, the MDT measurement may be performed by the CU-UP entity, and the CU-UP entity may perform processing such as data analysis, optimization, or network performance monitoring based on the first measurement collection result.

Alternatively, optionally, the MDT measurement method provided in this embodiment of this application may further include the following step S604.

S604: The CU-UP entity sends the first measurement collection result to the CU-CP entity. Correspondingly, the CU-CP entity receives the first measurement collection result from the CU-UP entity.

Optionally, in this embodiment of this application, if the CU-UP entity notifies the CU-CP entity of the corresponding first measurement collection result through the control plane between the CU-UP entity and the CU-CP entity, the CU-UP entity may notify the CU-CP entity of the corresponding first measurement collection result through a control message. Alternatively, if the CU-UP entity notifies the CU-CP entity of the corresponding first measurement collection result through the user plane between the CU-UP entity and the CU-CP entity, the CU-UP entity may notify the CU-CP entity of the corresponding first measurement collection result through a tunnel (for example, a GTP-U tunnel). The tunnel may be a tunnel corresponding to the tunnel information in the first configuration information, or may be a tunnel negotiated in advance by the CU-CP entity and the CU-UP entity or a tunnel configured in the protocol. This is not specifically limited in this embodiment of this application.

Optionally, in this embodiment of this application, when notifying the CU-CP entity of the corresponding first measurement collection result, the CU-UP entity may also indicate the first measurement object corresponding to the first measurement collection result, or may indicate the granularity of the first measurement object corresponding to the first measurement collection result. This is not specifically limited in this embodiment of this application.

Optionally, in this embodiment of this application, after receiving the first measurement collection result from the CU-UP entity, the CU-CP entity may perform related data analysis on the first measurement collection result, and then perform SON to optimize the network, for example, automatically optimize some parameters of the network. This is not specifically limited in this embodiment of this application. Alternatively, the CU-CP entity may perform network performance monitoring after collecting the first measurement collection result. Alternatively, after collecting the first measurement collection result, the CU-CP entity may send the first measurement collection result to another entity, and the another entity performs network performance monitoring. This is not specifically limited in this embodiment of this application.

According to the foregoing steps S601 to S604, for the network device with an architecture in which the CU entity and the DU entity are separated, the MDT measurement may be performed by the CU-UP entity, and the CU-CP entity may collect the first measurement collection result, and perform processing such as data analysis, optimization, or network performance monitoring based on the first measurement collection result.

Optionally, the MDT measurement method provided in this embodiment of this application may further include the following steps S605 to S607.

S605: The CU-CP entity determines second configuration information, where the second configuration information is used by the DU entity of the network device to perform an MDT measurement on a second measurement object.

Optionally, the second configuration information in this embodiment of this application may include, for example, one or more of the following: the second measurement object, a granularity of the second measurement object, a second statistical period, or a second measurement collection result.

For related descriptions of that the second configuration information includes one or more of the following: the second measurement object, the granularity of the second measurement object, the second statistical period, and the manner of feeding back the second measurement collection result, refer to related descriptions of that the first configuration information includes one or more of the following: the first measurement object, the granularity of the first measurement object, the first statistical period, and the manner of feeding back the first measurement collection result in step S601. A difference lies in that, for example, the first configuration information in step S601 is replaced by the second configuration information in step S605; the first measurement object in step S601 is replaced by the second measurement object in step S605; the granularity of the first measurement object in step S601 is replaced by the granularity of the second measurement object in step S605; the first statistical period in step S601 is replaced by the second statistical period in step S605; the manner of feeding back the first measurement collection result in step S601 is replaced by the manner of feeding back the second measurement collection result in step S605; and that the CU-CP entity and the CU-UP entity negotiate in advance in step S601 is replaced by that the CU-CP entity and the DU entity negotiate in advance in step S605. For other related descriptions, refer to step S601. Details are not described herein again.

Optionally, in this embodiment of this application, the second measurement object may be, for example, received interference power, power headroom, a scheduling latency, traffic of a service, an IP throughput of a service, a packet loss rate of a service, or a processing latency of a service. A type of the service is not specifically limited in this embodiment of this application.

Optionally, in this embodiment of this application, the scheduling latency, the traffic of a service, the IP throughput of a service, the packet loss rate of a service, or the processing latency of a service may be further distinguished for uplink and downlink. For example, the scheduling latency includes at least one of an uplink scheduling latency or a downlink scheduling latency. Alternatively, the traffic of the service includes at least one of uplink traffic of the service or downlink traffic of the service. Alternatively, the IP throughput of the service includes at least one of an uplink IP throughput of the service or a downlink IP throughput of the service. Alternatively, the packet loss rate of the service includes at least one of an uplink packet loss rate of the service or a downlink packet loss rate of the service. Alternatively, the processing latency of the service includes at least one of an uplink processing latency of the service or a downlink processing latency of the service. This is not specifically limited in this embodiment of this application.

Optionally, in this embodiment of this application, the granularity of the second measurement object may be, for example, a QoS flow granularity, a 5QI granularity, or a DRB granularity. This is not specifically limited in this embodiment of this application.

Optionally, in this embodiment of this application, the second statistical period is used to represent a period in which the DU entity performs the MDT measurement on the second measurement object.

Optionally, in this embodiment of this application, for example, the manner of feeding back the second measurement collection result may be that the DU entity feeds back the second measurement collection result to the CU-CP entity through a user plane between the DU entity and the CU-CP entity. Alternatively, for example, the manner of feeding back the second measurement collection result may be that the DU entity feeds back the second measurement collection result to the CU-CP entity through a control plane between the DU entity and the CU-CP entity. This is not specifically limited in this embodiment of this application.

Optionally, in this embodiment of this application, if the manner of feeding back the second measurement collection result is that the DU entity feeds back the second measurement collection result to the CU-CP entity through the user plane between the DU entity and the CU-CP entity, the second configuration information in this embodiment of this application may further include corresponding tunnel information. The tunnel information is used by the DU entity to feed back the second measurement collection result to the CU-CP entity. For example, the tunnel information may be, for example, GTP-U tunnel information. This is not specifically limited in this embodiment of this application.

Optionally, in this embodiment of this application, the second configuration information may further include configuration information of a trigger event that the DU entity reports the second measurement collection result, and the configuration information of the trigger event may include, for example, a trigger threshold. For example, when a measurement result of the processing latency of the service is lower than the trigger threshold, the DU entity reports the corresponding second measurement collection result or reports an event to the CU-CP entity. This is not specifically limited in this embodiment of this application.

S606: The CU-CP entity sends the second configuration information to the DU entity. Correspondingly, the DU entity receives the second configuration information from the CU-CP entity.

For example, the CU-CP entity may send the second configuration information to the DU entity through a message of the F1-C interface shown in FIG. 2, and the DU entity may receive the second configuration information from the CU-CP entity through a message of the F1-C interface shown in FIG. 2. In this embodiment of this application, the message of the F1-C interface may be an improvement on an existing message, or may be a newly defined message. This is not specifically limited in this embodiment of this application. For example, the F1-C interface message may be, for example, an RRC message.

S607: The DU entity performs the MDT measurement on the second measurement object based on the second configuration information, to obtain the second measurement collection result.

Optionally, in this embodiment of this application, the DU entity may perform the corresponding MDT measurement based on at least one of the second measurement object, the granularity of the second measurement object, or the second statistical period in the second configuration information.

Optionally, in this embodiment of this application, the second measurement collection result may be, for example, a statistical result of received interference power, a statistical result of power headroom, a statistical result of the scheduling latency, a statistical result of the traffic of the service, a statistical result of the IP throughput of the service, a statistical result of the packet loss rate of the service, a statistical result of the processing latency of the service, or the like. A corresponding statistical result may be specific measured values, or may be a distribution corresponding to specific measured values. This is not specifically limited in this embodiment of this application.

Optionally, in this embodiment of this application, after obtaining the second measurement collection result, the DU entity may perform related data analysis on the second measurement collection result, and then perform SON to optimize a network, for example, automatically optimize some parameters of the network. This is not specifically limited in this embodiment of this application. Alternatively, the DU entity may perform network performance monitoring after collecting the second measurement collection result. Alternatively, after collecting the second measurement collection result, the DU entity may send the second measurement collection result to another entity, and the another entity performs network performance monitoring. This is not specifically limited in this embodiment of this application.

According to the foregoing steps S605 to S607, for the network device with an architecture in which the CU entity and the DU entity are separated, the MDT measurement may be performed by the DU entity, and the DU entity may perform processing such as data analysis, optimization, or network performance monitoring based on the second measurement collection result.

Alternatively, optionally, the MDT measurement method provided in this embodiment of this application may further include the following step S608:

S608: The DU entity sends the second measurement collection result to the CU-CP entity. Correspondingly, the CU-CP entity receives the second measurement collection result from the DU entity.

Optionally, in this embodiment of this application, if the DU entity notifies the CU-CP entity of the corresponding second measurement collection result through the control plane between the DU entity and the CU-CP entity, the DU entity may notify the CU-CP entity of the corresponding second measurement collection result through a control message. Alternatively, if the DU entity notifies the CU-CP entity of the corresponding second measurement collection result through the user plane between the DU entity and the CU-CP entity, the DU entity may notify the CU-CP entity of the corresponding second measurement collection result through a tunnel (for example, the GTP-U tunnel). The tunnel may be a tunnel corresponding to the tunnel information in the second configuration information, or may be a tunnel negotiated in advance by the CU-CP entity and the DU entity or a tunnel configured in the protocol. This is not specifically limited in this embodiment of this application.

Optionally, in this embodiment of this application, if the CU-CP entity and the CU-UP entity are physically integrated, the DU entity sends the second measurement collection result to the CU entity, and the CU entity receives the second measurement collection result from the DU entity. This is not specifically limited in this embodiment of this application.

Optionally, in this embodiment of this application, when notifying the CU-CP entity of the corresponding second measurement collection result, the DU entity may also indicate the second measurement object corresponding to the second measurement collection result, or may indicate the granularity of the second measurement object corresponding to the second measurement collection result. This is not specifically limited in this embodiment of this application.

Optionally, in this embodiment of this application, after receiving the second measurement collection result from the DU entity, the CU-CP entity may perform related data analysis on the second measurement collection result, and then perform SON to optimize the network, for example, automatically optimize some parameters of the network. This is not specifically limited in this embodiment of this application. Alternatively, the CU-CP entity may perform network performance monitoring after collecting the second measurement collection result. Alternatively, after collecting the second measurement collection result, the CU-CP entity may send the second measurement collection result to another entity, and the another entity performs network performance monitoring. This is not specifically limited in this embodiment of this application.

According to the foregoing steps S605 to S608, for the network device with an architecture in which the CU entity and the DU entity are separated, the MDT measurement may be performed by the DU entity, and the CU-CP entity may collect the second measurement collection result, and perform processing such as data analysis, optimization, or network performance monitoring based on the second measurement collection result.

Optionally, the MDT measurement method provided in this embodiment of this application may further include the following steps S609 to S612.

S609: The CU-CP entity determines third configuration information, where the third configuration information is used by a terminal device to perform an MDT measurement on a third measurement object.

Optionally, the third configuration information in this embodiment of this application may include, for example, one or more of the following: the third measurement object, a granularity of the third measurement object, a third statistical period, and a manner of feeding back a third measurement collection result. This is not specifically limited in this embodiment of this application.

For related descriptions of that the third configuration information includes one or more of the following: the third measurement object, the granularity of the third measurement object, the third statistical period, and the manner of feeding back the third measurement collection result, refer to the related descriptions of that the first configuration information includes one or more of the following: the first measurement object, the granularity of the first measurement object, the first statistical period, and the manner of feeding back the first measurement collection result in step S601. A difference lies in that, for example, the first configuration information in step S601 is replaced by the third configuration information in step S609; the first measurement object in step S601 is replaced by the third measurement object in step S609; the granularity of the first measurement object in step S601 is replaced by the granularity of the third measurement object in step S609; the first statistical period in step S601 is replaced by the third statistical period in step S609; the manner of feeding back the first measurement collection result in step S601 is replaced by the manner of feeding back the third measurement collection result in step S609; and that the CU-CP entity and the CU-UP entity negotiate in advance in step S601 is replaced by that the CU-CP entity and the terminal device negotiate in advance in step S609. For other related descriptions, refer to step S601. Details are not described herein again.

Optionally, in this embodiment of this application, the third measurement object may be, for example, cell signal quality, power headroom, traffic of a service, an IP throughput of a service, a packet loss rate of a service, a processing latency of a service, or a round trip time of transmitting a data packet between the network device and the terminal device. A type of the service is not specifically limited in this embodiment of this application.

Optionally, in this embodiment of this application, the traffic of a service, the IP throughput of a service, the packet loss rate of a service, or the processing latency of a service may be further distinguished for uplink and downlink. For example, the traffic of a service includes at least one of uplink traffic of the service or downlink traffic of the service. Alternatively, the IP throughput of a service includes at least one of an uplink IP throughput of the service or a downlink IP throughput of the service. Alternatively, the packet loss rate of a service includes at least one of an uplink packet loss rate of the service or a downlink packet loss rate of the service. Alternatively, the processing latency of a service includes at least one of an uplink processing latency of the service or a downlink processing latency of the service. This is not specifically limited in this embodiment of this application.

Optionally, in this embodiment of this application, the granularity of the third measurement object may be, for example, a QoS flow granularity, a 5QI granularity, or a DRB granularity. This is not specifically limited in this embodiment of this application.

Optionally, in this embodiment of this application, the third statistical period is used to represent a period in which the terminal device performs the MDT measurement on the third measurement object.

Optionally, in this embodiment of this application, because the CU-CP entity communicates with the terminal device through the DU entity, the manner of feeding back the third measurement collection result may be that, for example, after the DU entity receives the third measurement collection result from the terminal device, the DU entity feeds back the third measurement collection result to the CU-CP entity through the user plane between the DU entity and the CU-CP entity. Alternatively, for example, the manner of feeding back the third measurement collection result may be as follows: After the DU entity receives the third measurement collection result from the terminal device, the DU entity feeds back the third measurement collection result to the CU-CP entity through the control plane between the DU entity and the CU-CP entity. This is not specifically limited in this embodiment of this application.

Optionally, in this embodiment of this application, if the manner of feeding back the third measurement collection result is as follows: After the DU entity receives the third measurement collection result from the terminal device, the DU entity feeds back the third measurement collection result to the CU-CP entity through the user plane between the DU entity and the CU-CP entity, the third configuration information in this embodiment of this application may further include corresponding tunnel information. The tunnel information is used by the terminal device to feed back the third measurement collection result to the CU-CP entity through the DU entity. For example, the tunnel information may be, for example, the GTP-U tunnel information. This is not specifically limited in this embodiment of this application.

Optionally, in this embodiment of this application, the third configuration information may further include configuration information of a trigger event that the terminal device reports the third measurement collection result, and the configuration information of the trigger event may include, for example, a trigger threshold. For example, when a measurement result of the processing latency of the service is lower than the trigger threshold, the terminal device reports the corresponding third measurement collection result or reports an event to the CU-CP entity. This is not specifically limited in this embodiment of this application.

S610: The CU-CP entity sends the third configuration information to the terminal device. Correspondingly, the terminal device receives the third configuration information from the CU-CP entity.

For example, the CU-CP entity may send the third configuration information to the DU entity through a message of the F1-C interface shown in FIG. 2, and then the DU entity sends the third configuration information to the terminal device. The terminal device may receive the third configuration information from the CU-CP entity through the DU entity. This is not specifically limited in this embodiment of this application.

S611: The terminal device performs the MDT measurement on the third measurement object based on the third configuration information, to obtain the third measurement collection result.

Optionally, in this embodiment of this application, the terminal device may perform the corresponding MDT measurement based on at least one of the third measurement object, the granularity of the third measurement object, or the third statistical period in the third configuration information.

Optionally, in this embodiment of this application, the third measurement collection result may be, for example, a statistical result of cell signal quality, a statistical result of power headroom, a statistical result of traffic of a service, a statistical result of an IP throughput of a service, a statistical result of a packet loss rate of a service, a statistical result of a processing latency of a service, or a statistical result of a round trip time of transmitting a data packet between the network device and the terminal device. A corresponding statistical result may be specific measured values, or may be a distribution corresponding to specific measured values. This is not specifically limited in this embodiment of this application.

Optionally, in this embodiment of this application, in addition to performing the MDT measurement based on the third configuration information, the terminal device may further collect some previous events based on a capability of the terminal device. For example, the terminal device may collect statistics on RACH failures, statistics on RLFs, statistics on RRC connection access failures, and the like. This is not specifically limited in this embodiment of this application.

S612: The terminal device sends the third measurement collection result to the CU-CP entity. Correspondingly, the CU-CP entity receives the third measurement collection result from the terminal device.

Optionally, in this embodiment of this application, the terminal device feeds back the third measurement collection result to the CU-CP entity through the DU entity. Therefore, after the DU entity receives the third measurement collection result from the terminal device, if the DU entity notifies the CU-CP entity of the corresponding third measurement collection result through the control plane between the DU entity and the CU-CP entity, the DU entity may notify the CU-CP entity of the corresponding third measurement collection result through a control message. Alternatively, if the DU entity notifies the CU-CP entity of the corresponding third measurement collection result through user plane between the DU entity and the CU-CP entity, the DU entity may notify the CU-CP entity of the corresponding third measurement collection result through a tunnel (for example, the GTP-U tunnel). The tunnel may be a tunnel corresponding to the tunnel information in the third configuration information, or may be a tunnel negotiated in advance by the CU-CP entity and the DU entity or a tunnel configured in the protocol. This is not specifically limited in this embodiment of this application.

Optionally, in this embodiment of this application, the terminal device may send the third measurement collection result to the DU entity through the control plane, or may send the third measurement collection result to the DU entity through the user plane. This is not specifically limited in this embodiment of this application.

Optionally, in this embodiment of this application, if the CU-CP and the CU-UP are one entity, the terminal device sends the third measurement collection result to the CU entity, and the CU entity receives the third measurement collection result from the terminal device. This is not specifically limited in this embodiment of this application.

Optionally, in this embodiment of this application, when notifying the CU-CP entity of the corresponding third measurement collection result, the terminal device may also indicate the third measurement object corresponding to the third measurement collection result, or may indicate the granularity of the third measurement object corresponding to the third measurement collection result. This is not specifically limited in this embodiment of this application.

Optionally, in this embodiment of this application, after receiving the third measurement collection result from the terminal device, the CU-CP entity may perform related data analysis on the third measurement collection result, and then perform SON to optimize the network, for example, automatically optimize some parameters of the network. This is not specifically limited in this embodiment of this application. Alternatively, the CU-CP entity may perform network performance monitoring after collecting the third measurement collection result. Alternatively, after collecting the third measurement collection result, the CU-CP entity may send the third measurement collection result to another entity, and the another entity performs network performance monitoring. This is not specifically limited in this embodiment of this application.

According to the foregoing steps S609 to S612, for the network device with an architecture in which the CU entity and the DU entity are separated, the MDT measurement may be performed by the terminal device, and the CU-CP entity may collect the third measurement collection result, and perform processing such as data analysis, optimization, or network performance monitoring based on the third measurement collection result.

Optionally, the MDT measurement method provided in this embodiment of this application may alternatively include the foregoing steps S605 to S607, optionally include step S608, optionally include steps S601 to S603 or steps S601 to S604, and optionally include steps S609 to S612. Alternatively, optionally, the MDT measurement method provided in this embodiment of this application may include the foregoing steps S609 to S612, optionally include steps S601 to S603 or steps S601 to S604, and optionally includes steps S605 to S607 or steps S605 to S608. In other words, in this embodiment of this application, there is no necessary association relationship between three MDT measurements: the MDT measurement performed by the CU-UP entity on the first measurement object, the MDT measurement performed by the DU entity on the second measurement object, and the MDT measurement performed by the terminal device on the third measurement object. This is not specifically limited in this embodiment of this application.

In addition, in a possible manner, in this embodiment of this application, the CU-CP entity may locally obtain (or determine) fourth configuration information, and measure a fourth measurement object based on the fourth configuration information, to obtain a fourth measurement collection result. The fourth measurement object may be, for example, a quantity of RRC connections (RRC connection number), and the fourth measurement collection result may be, for example, a statistical result of the quantity of RRC connections. This is not specifically limited in this embodiment of this application.

According to the MDT measurement method provided in this embodiment of this application, the MDT measurement can be performed by the network device with an architecture in which the CU entity and the DU entity are separated.

The actions of the CU-CP entity in the foregoing steps S601 to S612 may be performed by the processor 501 in the communications device 500 shown in FIG. 5 by invoking the application program code stored in the memory 503. This is not limited in this embodiment.

Figure 7:
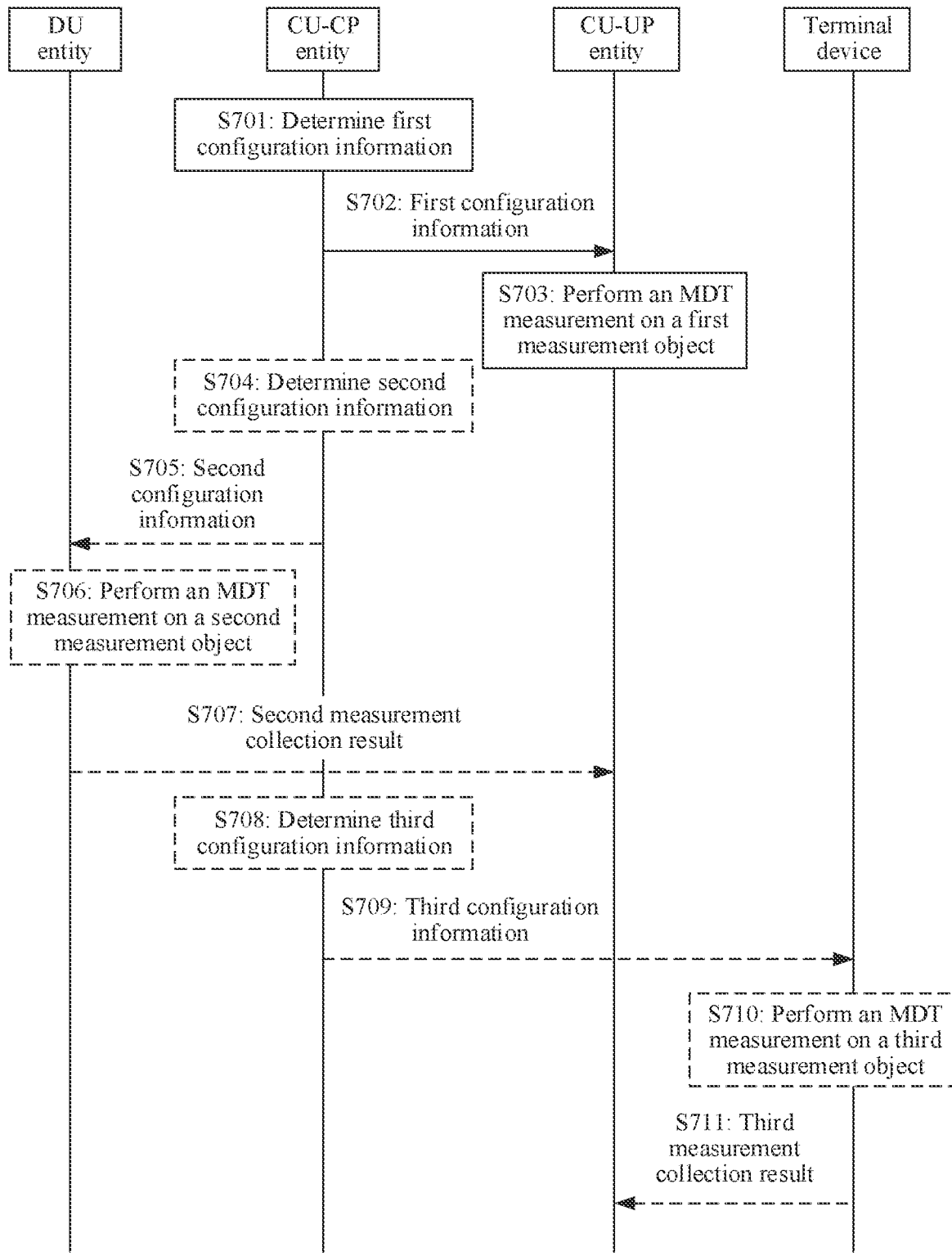
FIG. 7 is a schematic flowchart 2 of an MDT measurement method according to an embodiment of this application.

Optionally, an example in which the MDT measurement method provided in the embodiments of this application is applied to the communications system shown in FIG. 2 is used. FIG. 7 shows another MDT measurement method according to an embodiment of this application. The MDT measurement method includes the following steps.

S701 to S703: Same as steps S601 to S603 in the embodiment shown in FIG. 6. For related descriptions, refer to the embodiment shown in FIG. 6. Details are not described herein again.

Optionally, the MDT measurement method provided in this embodiment of this application may further include steps S704 to S706. Steps S704 to S706 are similar to steps S605 to S607 in the embodiment shown in FIG. 6. A difference lies in, for example, that manners of feeding back of a second measurement collection result are different. For example, in steps S704 to S706, for example, the manner of feeding back the second measurement collection result may be that a DU entity feeds back the second measurement collection result to a CU-UP entity through a user plane between the DU entity and the CU-UP entity. Alternatively, for example, the manner of feeding back the second measurement collection result may be that a DU entity feeds back the second measurement collection result to a CU-UP entity through a control plane between the DU entity and the CU-UP entity. This is not specifically limited in this embodiment of this application. In addition, optionally, in steps S704 to S706, if the manner of feeding back the second measurement collection result is that the DU entity feeds back the second measurement collection result to the CU-UP entity through the user plane between the DU entity and the CU-UP entity, second configuration information in this embodiment of this application may further include corresponding tunnel information. The tunnel information is used by the DU entity to feed back the second measurement collection result to the CU-UP entity. For example, the tunnel information may be, for example, GTP-U tunnel information. This is not specifically limited in this embodiment of this application. For other related descriptions, refer to the embodiment shown in FIG. 6. Details are not described herein again.

Alternatively, optionally, the MDT measurement method provided in this embodiment of this application may further include the following step S707:

S707: The DU entity sends the second measurement collection result to the CU-UP entity. Correspondingly, the CU-UP entity receives the second measurement collection result from the DU entity.

Optionally, in this embodiment of this application, if the DU entity notifies the CU-UP entity of the corresponding second measurement collection result through the control plane between the DU entity and the CU-UP entity, the DU entity may notify the CU-UP entity of the corresponding second measurement collection result through a control message. Alternatively, if the DU entity notifies the CU-UP entity of the corresponding second measurement collection result through the user plane between the DU entity and the CU-UP entity, the DU entity may notify the CU-UP entity of the corresponding second measurement collection result through a tunnel (for example, a GTP-U tunnel). The tunnel may be a tunnel corresponding to the tunnel information in the second configuration information, or may be a tunnel negotiated in advance by the CU-UP entity and the DU entity or a tunnel configured in a protocol. This is not specifically limited in this embodiment of this application.

Optionally, in this embodiment of this application, if a CU-CP entity and the CU-UP entity are physically integrated, the DU entity sends the second measurement collection result to a CU entity, and the CU entity receives the second measurement collection result from the DU entity. This is not specifically limited in this embodiment of this application.

Optionally, in this embodiment of this application, when notifying the CU-UP entity of the corresponding second measurement collection result, the DU entity may also indicate a second measurement object corresponding to the second measurement collection result, or may indicate a granularity of a second measurement object corresponding to the second measurement collection result. This is not specifically limited in this embodiment of this application.

Optionally, in this embodiment of this application, after receiving the second measurement collection result from the DU entity, the CU-UP entity may perform related data analysis on the second measurement collection result, and then perform SON to optimize a network, for example, automatically optimize some parameters of the network. This is not specifically limited in this embodiment of this application. Alternatively, the CU-UP entity may perform network performance monitoring after collecting the second measurement collection result. Alternatively, after collecting the second measurement collection result, the CU-UP entity may send the second measurement collection result to another entity, and the another entity performs network performance monitoring. This is not specifically limited in this embodiment of this application.

According to the foregoing steps S704 to S707, for a network device with an architecture in which the CU entity and the DU entity are separated, an MDT measurement may be performed by the DU entity, and the CU-UP entity may collect the second measurement collection result, and perform processing such as data analysis, optimization, or network performance monitoring based on the second measurement collection result.

Alternatively, optionally, the MDT measurement method provided in this embodiment of this application may further include steps S708 to S710. Steps S708 to S710 are similar to steps S609 to S611 in the embodiment shown in FIG. 6. A difference lies in, for example, that manners of feeding back of a third measurement collection result are different. For example, in steps S708 to S710, the CU-UP entity communicates with a terminal device through the DU entity. Therefore, the manner of feeding back the third measurement collection result may be, for example, as follows: After the DU entity receives the third measurement collection result from the terminal device, the DU entity feeds back the third measurement collection result to the CU-UP entity through the user plane between the DU entity and the CU-UP entity. Alternatively, for example, the manner of feeding back the third measurement collection result may be as follows: After the DU entity receives the third measurement collection result from the terminal device, the DU entity feeds back the third measurement collection result to the CU-UP entity through the control plane between the DU entity and the CU-UP entity. This is not specifically limited in this embodiment of this application. In addition, in steps S708 to S710, if the manner of feeding back the third measurement collection result is as follows: After the DU entity receives the third measurement collection result from the terminal device, the DU entity feeds back the third measurement collection result to the CU-UP entity through the user plane between the DU entity and the CU-UP entity, third configuration information in this embodiment of this application may further include corresponding tunnel information. The tunnel information is used by the terminal device to feed back the third measurement collection result to the CU-UP entity through the DU entity. For example, the tunnel information may be, for example, the GTP-U tunnel information. This is not specifically limited in this embodiment of this application. For other related descriptions, refer to the embodiment shown in FIG. 6. Details are not described herein again.

After step S710, the MDT measurement method provided in this embodiment of this application further includes the following step S711:

S711: The terminal device sends the third measurement collection result to the CU-UP entity. Correspondingly, the CU-UP entity receives the third measurement collection result from the terminal device.

Optionally, in this embodiment of this application, the terminal device feeds back the third measurement collection result to the CU-UP entity through the DU entity. Therefore, after the DU entity receives the third measurement collection result from the terminal device, if the DU entity notifies the CU-UP entity of the corresponding third measurement collection result through a control plane of an F1 interface, the DU entity may notify the CU-UP entity of the corresponding third measurement collection result through a control message. Alternatively, if the DU entity notifies the CU-UP entity of the corresponding third measurement collection result through a user plane of an F1 interface, the DU entity may notify the CU-UP entity of the corresponding third measurement collection result through a tunnel (for example, the GTP-U tunnel). The tunnel may be a tunnel corresponding to the tunnel information in the third configuration information, or may be a tunnel negotiated in advance by the CU-UP entity and the DU entity or a tunnel configured in the protocol. This is not specifically limited in this embodiment of this application.

Optionally, in this embodiment of this application, the terminal device may send the third measurement collection result to the DU entity through the control plane, or may send the third measurement collection result to the DU entity through the user plane. This is not specifically limited in this embodiment of this application.

Optionally, in this embodiment of this application, if the CU-CP and the CU-UP are one entity, the terminal device sends the third measurement collection result to the CU entity, and the CU entity receives the third measurement collection result from the terminal device. This is not specifically limited in this embodiment of this application.

Optionally, in this embodiment of this application, when notifying the CU-UP entity of the corresponding third measurement collection result, the terminal device may also indicate a third measurement object corresponding to the third measurement collection result, or may indicate a granularity of a third measurement object corresponding to the third measurement collection result. This is not specifically limited in this embodiment of this application.

Optionally, in this embodiment of this application, after receiving the third measurement collection result from the terminal device, the CU-UP entity may perform related data analysis on the third measurement collection result, and then perform SON to optimize the network, for example, automatically optimize some parameters of the network. This is not specifically limited in this embodiment of this application. Alternatively, the CU-UP entity may perform network performance monitoring after collecting the third measurement collection result. Alternatively, after collecting the third measurement collection result, the CU-UP entity may send the third measurement collection result to another entity, and the another entity performs network performance monitoring. This is not specifically limited in this embodiment of this application.

According to the foregoing steps S708 to S711, for the network device with an architecture in which the CU entity and the DU entity are separated, an MDT measurement may be performed by the terminal device, and the CU-UP entity may collect the third measurement collection result, and perform processing such as data analysis, optimization, or network performance monitoring based on the third measurement collection result.

Optionally, the MDT measurement method provided in this embodiment of this application may further include the foregoing steps S704 to S706, optionally include step S707, optionally include steps S701 to S703, and optionally include steps S708 to S711. Alternatively, optionally, the MDT measurement method provided in this embodiment of this application may include the foregoing steps S708 to S711, optionally include steps S704 to S706 or steps S704 to S707, and optionally includes steps S701 to S703. In other words, in this embodiment of this application, there is no necessary association relationship between three MDT measurements: an MDT measurement performed by the CU-UP entity on a first measurement object, the MDT measurement performed by the DU entity on the second measurement object, and the MDT measurement performed by the terminal device on the third measurement object. This is not specifically limited in this embodiment of this application.

In addition, in a possible manner, in this embodiment of this application, the CU-CP entity may locally obtain (or determine) fourth configuration information, and measure a fourth measurement object based on the fourth configuration information, to obtain a fourth measurement collection result. The fourth measurement object may be, for example, a quantity of RRC connections, and the fourth measurement collection result may be, for example, a statistical result of the quantity of RRC connections. This is not specifically limited in this embodiment of this application. Optionally, the CU-CP entity may further send the fourth measurement collection result to the CU-UP entity. For related descriptions, refer to the descriptions of sending, by the CU-UP entity, a first measurement collection result to the CU-CP entity in the embodiment shown in FIG. 6. Details are not described herein again.

According to the MDT measurement method provided in this embodiment of this application, the MDT measurement can be performed by the network device with an architecture in which the CU entity and the DU entity are separated.

The actions of the CU-CP entity in the foregoing steps S701 to S711 may be performed by the processor 501 in the communications device 500 shown in FIG. 5 by invoking the application program code stored in the memory 503. This is not limited in this embodiment.

Figure 8:
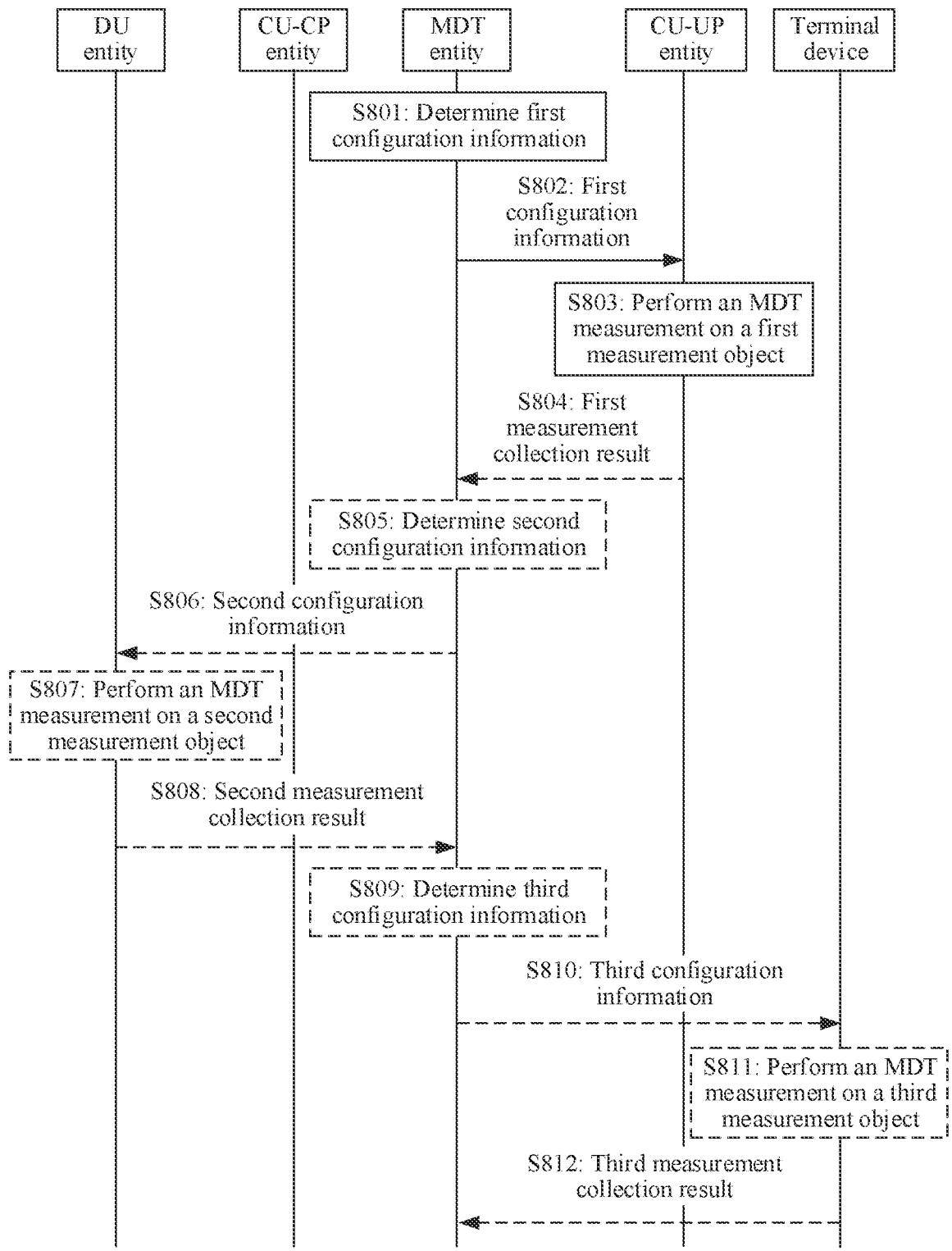
FIG. 8 is a schematic flowchart 3 of an MDT measurement method according to an embodiment of this application.

Optionally, an example in which the MDT measurement method provided in the embodiments of this application is applied to the communications system shown in FIG. 3 is used. FIG. 8 shows still another MDT measurement method according to an embodiment of this application. The MDT measurement method includes the following steps.

S801: An MDT entity determines first configuration information, where the first configuration information is used by a CU-UP entity of a network device to perform an MDT measurement on a first measurement object.

For related descriptions of the first configuration information, refer to the descriptions in step S601 in the embodiment shown in FIG. 6. A difference lies in, for example, that manners of feeding back of a first measurement collection result are different. For example, in step S801, the manner of feeding back the first measurement collection result may be, for example, that the CU-UP entity feeds back the first measurement collection result to the MDT entity through a user plane between the MDT entity and the CU-UP entity. Alternatively, the manner of feeding back the first measurement collection result may be, for example, that the CU-UP entity feeds back the first measurement collection result to the MDT entity through a control plane between the MDT entity and the CU-UP entity. This is not specifically limited in this embodiment of this application. In addition, optionally, in step S801, if the manner of feeding back the first measurement collection result is that the CU-UP entity feeds back the first measurement collection result to the MDT entity through the user plane between the MDT entity and the CU-UP entity, the first configuration information in this embodiment of this application may further include corresponding tunnel information. The tunnel information is used by the CU-UP entity to feed back the first measurement collection result to the MDT entity. For example, the tunnel information may be, for example, GTP-U tunnel information. This is not specifically limited in this embodiment of this application. For other related descriptions, refer to the embodiment shown in FIG. 6. Details are not described herein again.

S802: The MDT entity sends the first configuration information to the CU-UP entity. Correspondingly, the CU-UP entity receives the first configuration information from the MDT entity.

For example, the MDT entity may send the first configuration information to the CU-UP entity through a message between the MDT entity and the CU-UP entity shown in FIG. 3, and the CU-UP entity may receive the first configuration information from the MDT entity through the message between the MDT entity and the CU-UP entity shown in FIG. 3. This is not specifically limited in this embodiment of this application.

S803: Same as step S603 in the embodiment shown in FIG. 6. For related descriptions, refer to the embodiment shown in FIG. 6. Details are not described herein again.

According to the foregoing steps S801 to S803, for a network device with an architecture in which a CU entity and a DU entity are separated, an MDT measurement may be performed by the CU-UP entity, and the CU-UP entity may perform processing such as data analysis, optimization, or network performance monitoring based on the first measurement collection result.

Alternatively, optionally, the MDT measurement method provided in this embodiment of this application may further include the following step S804:

S804: The CU-UP entity sends the first measurement collection result to the MDT entity. Correspondingly, the MDT entity receives the first measurement collection result from the CU-UP entity.

Optionally, in this embodiment of this application, if the CU-UP entity notifies the MDT entity of the corresponding first measurement collection result through the control plane between the MDT entity and the CU-UP entity, the CU-UP entity may notify the MDT entity of the corresponding first measurement collection result. Alternatively, if the CU-UP entity notifies the MDT entity of the corresponding first measurement collection result through the user plane between the MDT entity and the CU-UP entity, the CU-UP entity may notify the MDT entity of the corresponding first measurement collection result through a tunnel (for example, a GTP-U tunnel). The tunnel may be a tunnel corresponding to the tunnel information in the first configuration information, or may be a tunnel negotiated in advance by the MDT entity and the CU-UP entity or a tunnel configured in a protocol. This is not specifically limited in this embodiment of this application.

Optionally, in this embodiment of this application, when notifying the MDT entity of the corresponding first measurement collection result, the CU-UP entity may also indicate the first measurement object corresponding to the first measurement collection result, or may indicate a granularity of the first measurement object corresponding to the first measurement collection result. This is not specifically limited in this embodiment of this application.

Optionally, in this embodiment of this application, after receiving the first measurement collection result from the CU-UP entity, the MDT entity may perform related data analysis on the first measurement collection result, and then perform SON to optimize a network, for example, automatically optimize some parameters of the network. This is not specifically limited in this embodiment of this application. Alternatively, the MDT entity may perform network performance monitoring after collecting the first measurement collection result. Alternatively, after collecting the first measurement collection result, the MDT entity may send the first measurement collection result to another entity, and the another entity performs network performance monitoring. This is not specifically limited in this embodiment of this application.

According to the foregoing steps S801 to S804, for the network device with an architecture in which the CU entity and the DU entity are separated, the MDT measurement may be performed by the CU-UP entity, and the MDT entity may collect the first measurement collection result, and perform processing such as data analysis, optimization, or network performance monitoring based on the first measurement collection result.

Optionally, the MDT measurement method provided in this embodiment of this application may further include the following steps S805 to S807.

S805: The MDT entity determines second configuration information, where the second configuration information is used by the DU entity of the network device to perform the MDT measurement on the first measurement object.

For related descriptions of the second configuration information, refer to the descriptions in step S605 in the embodiment shown in FIG. 6. A difference lies in, for example, that manners of feeding back of a second measurement collection result are different. For example, in step S805, the manner of feeding back the second measurement collection result may be, for example, that the DU entity feeds back the second measurement collection result to the MDT entity through a user plane between the MDT entity and the DU entity. Alternatively, the manner of feeding back the second measurement collection result may be, for example, that the DU entity feeds back the second measurement collection result to the MDT entity through a control plane between the MDT entity and the DU entity. This is not specifically limited in this embodiment of this application. In addition, optionally, in step S805, if the manner of feeding back the second measurement collection result is that the DU entity feeds back the second measurement collection result to the MDT entity through the user plane between the MDT entity and the DU entity, the second configuration information in this embodiment of this application may further include corresponding tunnel information. The tunnel information is used by the DU entity to feed back the second measurement collection result to the MDT entity. For example, the tunnel information may be, for example, the GTP-U tunnel information. This is not specifically limited in this embodiment of this application. For other related descriptions, refer to the embodiment shown in FIG. 6. Details are not described herein again.

S806: The MDT entity sends the second configuration information to the DU entity. Correspondingly, the DU entity receives the second configuration information from the MDT entity.

For example, the DU entity may send the second configuration information to the DU entity through a message between the MDT entity and the DU entity shown in FIG. 3, and the DU entity may receive the second configuration information from the CU-CP entity through the message between the MDT entity and the DU entity shown in FIG. 3. This is not specifically limited in this embodiment of this application.

S807: Same as step S607 in the embodiment shown in FIG. 6. For related descriptions, refer to the embodiment shown in FIG. 6. Details are not described herein again.

According to the foregoing steps S805 to S807, for the network device with an architecture in which the CU entity and the DU entity are separated, the MDT measurement may be performed by the DU entity, and the MDT entity may perform processing such as data analysis, optimization, or network performance monitoring based on the second measurement collection result.

Alternatively, optionally, the MDT measurement method provided in this embodiment of this application may further include the following step S808:

S808: The DU entity sends the second measurement collection result to the MDT entity. Correspondingly, the MDT entity receives the second measurement collection result from the DU entity.

Optionally, in this embodiment of this application, if the DU entity notifies the MDT entity of the corresponding second measurement collection result through the control plane between the DU entity and the MDT entity, the DU entity may notify the MDT entity of the corresponding second measurement collection result through a control message. Alternatively, if the DU entity notifies the MDT entity of the corresponding second measurement collection result through the user plane between the MDT entity and the CU-UP entity, the DU entity may notify the MDT entity of the corresponding second measurement collection result through a tunnel (for example, the GTP-U tunnel). The tunnel may be a tunnel corresponding to the tunnel information in the second configuration information, or may be a tunnel negotiated in advance by the MDT entity and the DU entity or a tunnel configured in the protocol. This is not specifically limited in this embodiment of this application.

Optionally, in this embodiment of this application, when notifying the MDT entity of the corresponding second measurement collection result, the DU entity may also indicate a second measurement object corresponding to the second measurement collection result, or may indicate a granularity of a second measurement object corresponding to the second measurement collection result. This is not specifically limited in this embodiment of this application.

Optionally, in this embodiment of this application, after receiving the second measurement collection result from the DU entity, the MDT entity may perform related data analysis on the second measurement collection result, and then perform SON to optimize the network, for example, automatically optimize some parameters of the network. This is not specifically limited in this embodiment of this application. Alternatively, the MDT entity may perform network performance monitoring after collecting the second measurement collection result. Alternatively, after collecting the second measurement collection result, the MDT entity may send the second measurement collection result to another entity, and the another entity performs network performance monitoring. This is not specifically limited in this embodiment of this application.

According to the foregoing steps S805 to S808, for the network device with an architecture in which the CU entity and the DU entity are separated, the MDT measurement may be performed by the DU entity, and the MDT entity may collect the second measurement collection result, and perform processing such as data analysis, optimization, or network performance monitoring based on the second measurement collection result.

Alternatively, optionally, the MDT measurement method provided in this embodiment of this application may further include the following steps S809 to S812.

S809: The MDT entity determines third configuration information, where the third configuration information is used by a terminal device to perform an MDT measurement on a third measurement object.

For related descriptions of the third configuration information, refer to the descriptions in step S609 in the embodiment shown in FIG. 6. A difference lies in, for example, that manners of feeding back of a third measurement collection result are different. For example, in step S809, the terminal device may send the third measurement collection result to the CU-CP entity through the DU entity, and then the CU-CP entity sends the third measurement collection result to the MDT entity. In other words, the terminal device communicates with the MDT entity through the DU entity and the CU-CP entity. The manner of feeding back the third measurement collection result may be, for example, as follows: After DU entity receives the third measurement collection result from the terminal device, the DU entity may feed back the third measurement collection result to the CU-CP entity through the user plane between the CU-CP entity and the DU entity, and the CU-CP entity feeds back the third measurement collection result to the MDT entity through the user plane between the MDT entity and the CU-CP entity. Alternatively, the manner of feeding back the third measurement collection result may be, for example, as follows: After the DU entity receives the third measurement collection result from the terminal device, the DU entity feeds back the third measurement collection result to the CU-CP entity through the control plane between the CU-CP entity and the DU entity, and the CU-CP entity feeds back the third measurement collection result to the MDT entity through the control plane between the MDT entity and the CU-CP entity. This is not specifically limited in this embodiment of this application. In addition, optionally, in step S809, it is assumed that the manner of feeding back the third measurement collection result is as follows: After the DU entity receives the third measurement collection result from the terminal device, the DU entity feeds back the third measurement collection result to the CU-CP entity through the user plane between the CU-CP entity and the DU entity. Then, the CU-CP entity feeds back the third measurement collection result to the MDT entity through the user plane between the MDT entity and the CU-CP entity. In this case, the third configuration information in this embodiment of this application may further include corresponding tunnel information. The tunnel information is used by the DU entity to feed back the third measurement collection result to the CU-CP entity, and is used by the CU-CP entity to feed back the third measurement collection result to the MDT entity. For example, the tunnel information may be, for example, the GTP-U tunnel information. This is not specifically limited in this embodiment of this application. For other related descriptions, refer to the embodiment shown in FIG. 6. Details are not described herein again.

S810: The MDT entity sends the third configuration information to the terminal device. Correspondingly, the terminal device receives the third configuration information from the MDT entity.

For example, the MDT entity may send the third configuration information to the CU-CP entity through a message between the MDT entity and the CU-CP entity shown in FIG. 3. Then, the CU-CP entity sends the third configuration information to the terminal device through the DU entity, and the terminal device may receive the third configuration information from the DU entity. This is not specifically limited in this embodiment of this application. For a related implementation in which the CU-CP entity sends the third configuration information to the terminal device through the DU entity, refer to the description of step S610 in the embodiment shown in FIG. 6. Details are not described herein again.

S811: Same as step S611 in the embodiment shown in FIG. 6. For related descriptions, refer to the embodiment shown in FIG. 6. Details are not described herein again.

S812: The terminal device sends the third measurement collection result to the MDT entity. Correspondingly, the MDT entity receives the third measurement collection result from the terminal device.

Optionally, in this embodiment of this application, the terminal device may send the third measurement collection result to the CU-CP entity through the DU entity, and then the CU-CP entity sends the third measurement collection result to the MDT entity. This is not specifically limited in this embodiment of this application. For a manner in which the terminal device feeds back the third measurement collection result to the CU-CP entity, refer to step S612 in the embodiment shown in FIG. 6. Details are not described herein again. Further, after the CU-CP entity obtains the third measurement collection result, if the CU-CP entity feeds back the third measurement collection result to the MDT entity through the control plane between the MDT entity and the CU-CP entity, the CU-CP entity may notify the MDT entity of the corresponding third measurement collection result through a control message. Alternatively, if the CU-CP entity feeds back the third measurement collection result to the MDT entity through the user plane between the MDT entity and the CU-CP entity, the CU-CP entity may notify the MDT entity of the corresponding third measurement collection result through a tunnel (for example, the GTP-U tunnel). The tunnel may be a tunnel corresponding to the tunnel information in the third configuration information, or may be a tunnel negotiated in advance by the MDT entity and the CU-CP entity or a tunnel configured in the protocol. This is not specifically limited in this embodiment of this application.

Optionally, in this embodiment of this application, when notifying the MDT entity of the corresponding third measurement collection result, the terminal device may also indicate the third measurement object corresponding to the third measurement collection result, or may indicate a granularity of the third measurement object corresponding to the third measurement collection result. This is not specifically limited in this embodiment of this application.

Optionally, in this embodiment of this application, after receiving the third measurement collection result from the terminal device, the MDT entity may perform related data analysis on the third measurement collection result, and then perform SON to optimize the network, for example, automatically optimize some parameters of the network. This is not specifically limited in this embodiment of this application. Alternatively, the MDT entity may perform network performance monitoring after collecting the third measurement collection result. Alternatively, after collecting the third measurement collection result, the MDT entity may send the third measurement collection result to another entity, and the another entity performs network performance monitoring. This is not specifically limited in this embodiment of this application.

According to the foregoing steps S809 to S812, for the network device with an architecture in which the CU entity and the DU entity are separated, the MDT measurement may be performed by the terminal device, and the MDT entity may collect the third measurement collection result, and perform processing such as data analysis, optimization, or network performance monitoring based on the third measurement collection result.

Optionally, the MDT measurement method provided in this embodiment of this application may alternatively include the foregoing steps S805 to S807, optionally include step S808, optionally include steps S801 to S803 or steps S801 to S804, and optionally include steps S809 to S812. Alternatively, optionally, the MDT measurement method provided in this embodiment of this application may include the foregoing steps S809 to S812, optionally include steps S801 to S803 or steps S801 to S804, and optionally includes steps S805 to S807 or steps S805 to S808. In other words, in this embodiment of this application, there is no necessary association relationship between three MDT measurements: the MDT measurement performed by the CU-UP entity on the first measurement object, an MDT measurement performed by the DU entity on a second measurement object, and the MDT measurement performed by the terminal device on the third measurement object. This is not specifically limited in this embodiment of this application.

According to the MDT measurement method provided in this embodiment of this application, the MDT measurement can be performed by the network device with an architecture in which the CU entity and the DU entity are separated.

Optionally, the MDT measurement method provided in this embodiment of this application may also be used for an MDT measurement of a network device with an architecture in which the CU-CP entity and the CU-UP entity are physically integrated. In this case, it only needs to replace the CU-CP entity or the CU-UP entity with the CU entity. For other related descriptions, refer to the foregoing embodiment. Details are not described herein again.

The actions of the CU-CP entity in the foregoing steps S701 to S712 may be performed by the processor 501 in the communications device 500 shown in FIG. 5 by invoking the application program code stored in the memory 503. This is not limited in this embodiment.

Figure 9:
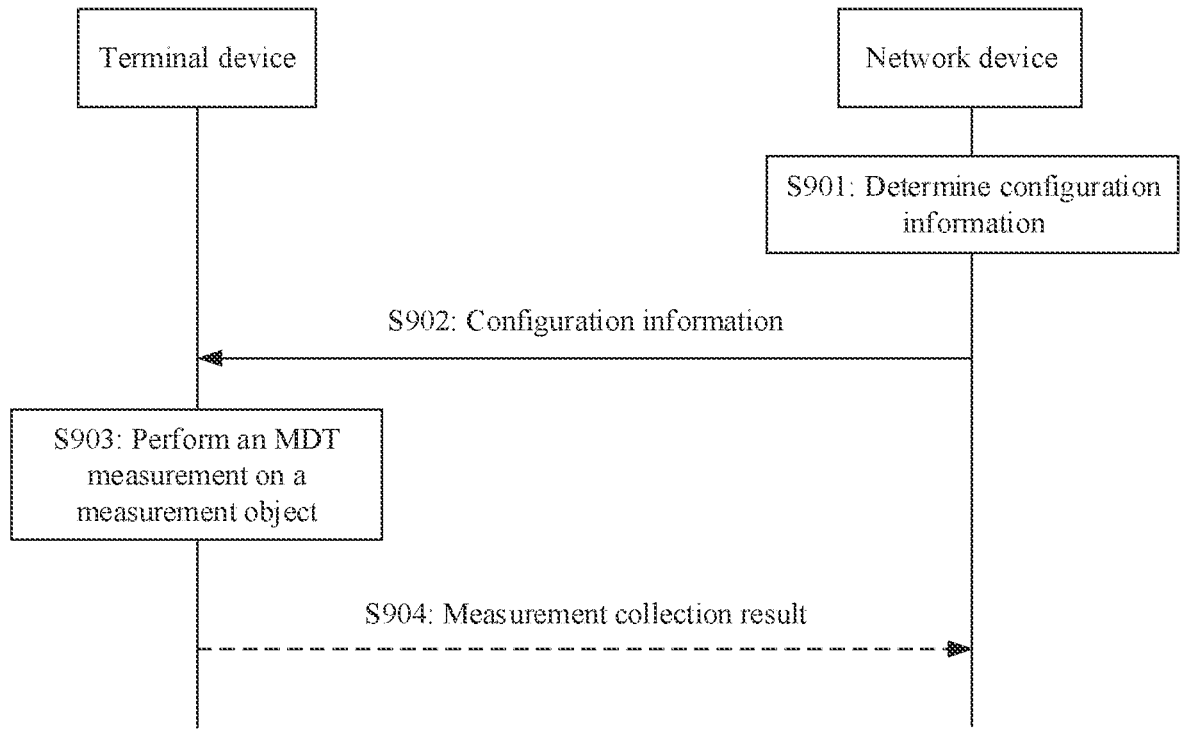
FIG. 9 is a schematic flowchart 4 of an MDT measurement method according to an embodiment of this application.

Optionally, an example in which the MDT measurement method provided in the embodiments of this application is applied to the communications system shown in FIG. 4 is used. FIG. 9 shows still yet another MDT measurement method according to an embodiment of this application. The MDT measurement method includes the following steps.

S901: An MDT protocol layer of a network device determines configuration information, where the configuration information is used by at least one of an MDT protocol layer of a terminal device or an RRC protocol layer of a terminal device to perform an MDT measurement on a measurement object.

It should be noted that the MDT measurement in this embodiment of this application may include a measurement or collection. A general description is provided herein, and this embodiment of this application imposes no specific limitation.

Optionally, for the configuration information in this embodiment of this application, refer to related descriptions of third configuration information in the embodiment shown in FIG. 6. A difference lies in, for example, that manners of feeding back of a measurement collection result are different. For example, in step S901, the measurement collection result may be fed back, for example, through a control plane between the terminal device and the network device. This is not specifically limited in this embodiment of this application.

S902: The MDT protocol layer of the network device sends the configuration information to the MDT protocol layer of the terminal device. Correspondingly, the MDT protocol layer of the terminal device receives the configuration information from the MDT protocol layer of the network device. The configuration information reaches the MDT protocol layer of the terminal device through the MDT protocol layer of the network device, an RRC protocol layer of the network device, and the RRC protocol layer of the terminal device.

Optionally, in this embodiment of this application, the configuration information is encapsulated in a first transmission container (contain). The first transmission container is carried in a downlink RRC message for transmission between the RRC protocol layer of the network device and the RRC protocol layer of the terminal device. In this way, the configuration information can be transparently transmitted between the MDT protocol layer of the terminal device and the MDT protocol layer of the network device. In other words, a protocol corresponding to an RRC message does not need to be modified during evolution of an MDT function, so that an MDT measurement function can be decoupled from an RRC function, thereby facilitating subsequent independent evolution of the MDT function.

S903: At least one of the MDT protocol layer of the terminal device or the RRC protocol layer of the terminal device performs an MDT measurement on the measurement object based on the configuration information, to obtain a measurement collection result.

In other words, in this embodiment of this application, the MDT protocol layer of the terminal device may perform an MDT measurement on the measurement object based on the configuration information. Alternatively, the RRC protocol layer of the terminal device may perform an MDT measurement on the measurement object based on the configuration information. Alternatively, the MDT protocol layer of the terminal device and the RRC protocol layer of the terminal device may perform an MDT measurement on the measurement object based on the configuration information. This is not specifically limited in this embodiment of this application.

For related descriptions of the measurement result, refer to the related descriptions of a third measurement collection result in the embodiment shown in FIG. 6. Details are not described herein again.

Optionally, in this embodiment of this application, if the RRC protocol layer of the terminal device performs an MDT measurement on the measurement object, after the MDT protocol layer of the terminal device obtains the configuration information, the MDT protocol layer of the terminal device needs to send all or a part of parsed configuration information to the RRC protocol layer of the terminal device. Then, the RRC protocol layer of the terminal device performs an MDT measurement on the measurement object. After obtaining a measurement collection result, the RRC protocol layer of the terminal device needs to feed back the measurement collection result to the MDT protocol layer of the terminal device. A general description is provided herein, and details are not described below again.

Optionally, in this embodiment of this application, after obtaining a measurement collection result, the MDT protocol layer of the terminal device may perform related data analysis on the measurement collection result, and then perform SON to optimize a network, for example, automatically optimize some parameters of the network. This is not specifically limited in this embodiment of this application.

Alternatively, optionally, the MDT measurement method provided in this embodiment of this application may further include the following step S904:

S904: The MDT protocol layer of the terminal device sends the measurement collection result to the MDT protocol layer of the network device. Correspondingly, the MDT protocol layer of the network device receives the measurement collection result from the MDT protocol layer of the terminal device. The measurement collection result reaches the MDT protocol layer of the network device through the MDT protocol layer of the terminal device, the RRC protocol layer of the terminal device, and the RRC protocol layer of the network device.

Optionally, in this embodiment of this application, the measurement collection result is encapsulated in a second transmission container. The second transmission container is carried in an uplink RRC message for transmission between the RRC protocol layer of the terminal device and the RRC protocol layer of the network device. In this way, the measurement collection result can be transparently transmitted between the MDT protocol layer of the terminal device and the MDT protocol layer of the network device. In other words, a protocol corresponding to an RRC message does not need to be modified during evolution of the MDT function, so that the MDT measurement function can be decoupled from the RRC function, thereby facilitating subsequent independent evolution of the MDT function.

Optionally, in this embodiment of this application, after obtaining the measurement collection result, the MDT protocol layer of the network device may perform related data analysis on the measurement collection result, and then perform SON to optimize the network, for example, automatically optimize some parameters of the network. This is not specifically limited in this embodiment of this application. Alternatively, the network device may perform network performance monitoring after collecting the measurement collection result. Alternatively, after collecting the measurement collection result, the network device may send the measurement collection result to another entity, and the another entity performs network performance monitoring. This is not specifically limited in this embodiment of this application.

According to the MDT measurement method provided in this embodiment of this application, in one aspect, at least one of the MDT protocol layer of the terminal device or the RRC protocol layer of the terminal device performs the MDT measurement on the measurement object. In another aspect, in a current technology, delivery of the configuration information during the MDT measurement and reporting of the measurement collection result are both completed through exchanging RRC messages between the terminal device and the network device. Consequently, the protocol corresponding to the RRC message needs to be modified during MDT function evolution, and there is a strong dependency relationship between the MDT measurement function and the RRC function. However, in the MDT measurement method provided in this embodiment of this application, the MDT measurement function may be decoupled from the RRC function, thereby facilitating subsequent independent evolution of the MDT function.

The actions of the terminal device or the network device in the foregoing steps S901 to S904 may be performed by the processor 501 in the communications device 500 shown in FIG. 5 by invoking the application program code stored in the memory 503. This is not limited in this embodiment.

It should be noted that, in the foregoing embodiments of this application, the network device, a CU-CP entity in the network device, a DU entity in the network device, a CU-UP entity in the network device, or an MDT entity may initiate an MDT measurement without a notification. For example, an MDT measurement is initiated for SON. This is not specifically limited in this embodiment of this application.

Figure 10:
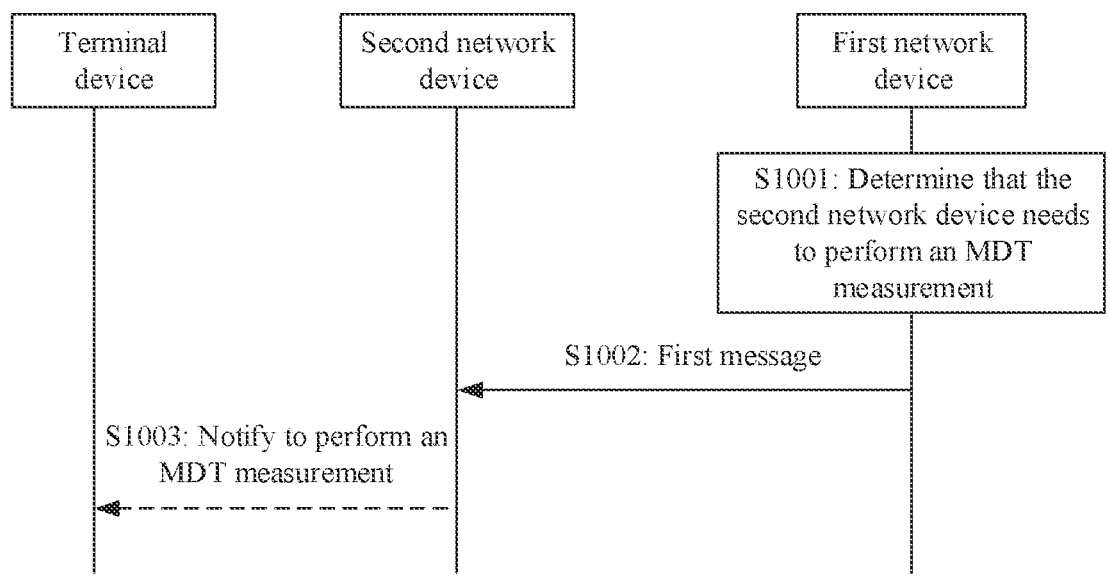
FIG. 10 is a schematic flowchart 5 of an MDT measurement method according to an embodiment of this application.

Optionally, as shown in FIG. 10, an embodiment of this application may further provide an MDT measurement method. The MDT measurement method includes the following steps.

S1001: A first network device determines that a second network device needs to perform an MDT measurement.

Optionally, in this embodiment of this application, the first network device may determine, in the following manners, that the second network device needs to perform an MDT measurement:

For example, the first network device determines that a terminal device served by the second network device always fails to be handed over. For example, the first network device receives an RRC reestablishment request message sent by a first terminal device. The RRC reestablishment request message carries an identifier of a cell served by the second network device. Alternatively, the first network device receives a handover request message sent by the second network device, but subsequently does not learn that the terminal device served by the second network device accesses the first network device.

Alternatively, for example, the first network device determines that the first terminal device has an RLF or an RRC connection establishment failure on the second network device. For example, the first network device receives an RLF report or an RRC connection establishment failure report from the first terminal device, and a corresponding serving cell, on the failure, included in the RLF report or the RRC connection establishment failure report is a cell served by the second network device.

In this embodiment of this application, for related descriptions of the first network device and the second network device, refer to descriptions of corresponding network devices in description of embodiments. Details are not described herein.

S1002: The first network device sends a first message to the second network device. Correspondingly, the second network device receives the first message from the first network device. The first message is used to notify the second network device to perform an MDT measurement.

Optionally, the MDT measurement in this embodiment of this application may be an existing logged MDT measurement or an immediate MDT measurement. This is not specifically limited in this embodiment of this application.

Optionally, the first message in this embodiment of this application may be, for example, an Xn interface message or an X2 interface message between network devices. The first message may be an improvement on an existing message, for example, the first message may be a resource status request message. Alternatively, the first message may be a newly defined message, for example, an MDT measurement request message. This is not specifically limited in this embodiment of this application.

Optionally, the first message in this embodiment of this application is not a terminal device-level message, but a cell-level or network device-level message. In other words, the first network device does not notify the second network device to measure a specific terminal device, but notifies the second network device to perform a measurement in a cell or on the second network device. This is not specifically limited in this embodiment of this application. Optionally, the identifier of the cell served by the second network device may be obtained through reporting by the terminal device. This is not specifically limited in this embodiment of this application.

Optionally, the first message in this embodiment of this application may include a corresponding measurement object on which the logged MDT measurement or the immediate MDT measurement is performed. For example, the first message includes a corresponding measurement object on which a RACH failure measurement, a signal strength measurement, a connection establishment failure measurement, an RLF failure measurement, or the like in the logged MDT measurement is performed. Alternatively, the first message includes a corresponding measurement object on which an RSRP and RSRQ measurement in the immediate MDT measurement, a power headroom measurement by a terminal, a received interference power measurement by an eNB, a data volume measurement separately for DL and UL, a scheduled IP packet throughput measurement, a packet latency measurement, a packet loss rate measurement, an RTT measurement, or the like is performed. This is not specifically limited in this embodiment of this application.

In this embodiment of this application, if the first network device indicates the second network device to perform an MDT measurement, the second network device may perform a related MDT measurement after obtaining the first message. This is not specifically limited in this embodiment of this application.

Alternatively, optionally, in this embodiment of this application, if the first network device indicates the second network device to perform an MDT measurement in a cell, the MDT measurement method provided in this embodiment of this application may further include the following step S1003:

S1003: The second network device notifies a terminal device in the served cell to perform an MDT measurement.

Optionally, in this embodiment of this application, the second network device may select a terminal device in the served cell to perform an MDT measurement. For example, the second network device notifies a terminal device in the cell specified by the first network device to perform an MDT measurement.

Optionally, the second network device may alternatively notify terminal devices in all cells served by the second network device to perform an MDT measurement. This is not specifically limited in this embodiment of this application.

Optionally, in this embodiment of this application, there are a plurality of manners in which the second network device selects a terminal device in a cell. For example, the second network device selects a terminal device based on subscription information of the terminal device, or performs an MDT measurement on all terminal devices that support MDT. This is not specifically limited in this embodiment of this application.

Optionally, in this embodiment of this application, after obtaining a measurement collection result, the second network device may perform related data analysis on the measurement collection result, and then perform SON to optimize a network, for example, automatically optimize some parameters of the network. This is not specifically limited in this embodiment of this application. Alternatively, the second network device may perform network performance monitoring after collecting the measurement collection result. Alternatively, after collecting the measurement collection result, the second network device may send the measurement collection result to another entity, and the another entity performs network performance monitoring. This is not specifically limited in this embodiment of this application.

Alternatively, optionally, in this embodiment of this application, after obtaining the measurement collection result, the second network device may further send the measurement collection result to the first network device. Then, the first network device performs related data analysis on the measurement collection result, and further performs SON to optimize the network, for example, automatically optimize some parameters of the network. This is not specifically limited in this embodiment of this application. Alternatively, the first network device may perform network performance monitoring after collecting the measurement collection result. Alternatively, after collecting the measurement collection result, the first network device may send the measurement collection result to another entity, and the another entity performs network performance monitoring. This is not specifically limited in this embodiment of this application.

According to the MDT measurement method provided in this embodiment of this application, the MDT measurement can be performed as required, so that a quantity of MDT measurements can be reduced.

The actions of the first network device or the second network device in the foregoing steps S1001 to S1003 may be performed by the processor 501 in the communications device 500 shown in FIG. 5 by invoking the application program code stored in the memory 503. This is not limited in this embodiment. The foregoing mainly describes the solutions provided in the embodiments of this application from a perspective of interaction between network elements. Correspondingly, an embodiment of this application further provides a communications apparatus, and the communications apparatus is configured to implement the foregoing methods. The communications apparatus may be a first entity (for example, a CU-CP entity or an MDT entity) in the foregoing method embodiments, or an apparatus including a first entity. Alternatively, the communications apparatus may be a network device in the foregoing method embodiments, or an apparatus including the foregoing network device. Alternatively, the communications apparatus may be a terminal device in the foregoing method embodiments, or an apparatus including the foregoing terminal device. Alternatively, the communications apparatus may be a first network device in the foregoing method embodiments, or an apparatus including the foregoing first network device. Alternatively, the communications apparatus may be a second network device in the foregoing method embodiment, or an apparatus including the foregoing second network device. It can be understood that, to implement the foregoing functions, the communications apparatus includes a corresponding hardware structure and/or software module for performing the functions. A person skilled in the art should be easily aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. During actual implementation, another division manner may be used.

Figure 11:
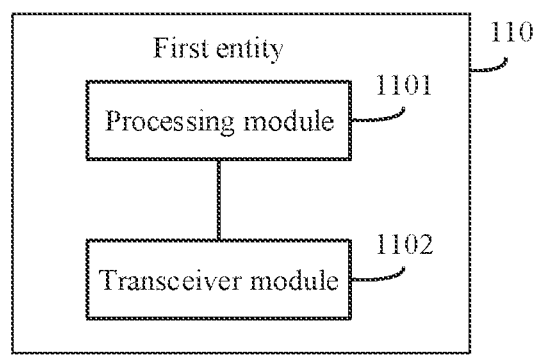
FIG. 11 is a schematic structural diagram of a first entity according to an embodiment of this application.

For example, the communications apparatus is the first entity (for example, the CU-CP entity or the MDT entity) in the foregoing method embodiments. When functional modules are obtained through division in an integrated manner, FIG. 11 is a schematic structural diagram of a first entity 110. The first entity 110 includes a processing module 1101 and a transceiver module 1102. The processing module 1101 is configured to determine first configuration information. The first configuration information is used by a centralized unit user plane CU-UP entity of a network device to perform an MDT measurement on a first measurement object. The transceiver module 1102 is configured to send the first configuration information to the CU-UP entity. The transceiver module 1102 may also be referred to as a transceiver unit, and is configured to implement a sending and/or receiving function, for example, may be a transceiver circuit, a transceiver machine, a transceiver, or a communications interface.

Optionally, the first configuration information includes one or more of the first measurement object, a granularity of the first measurement object, a first statistical period, or a manner of feeding back a first measurement collection result.

Optionally, the transceiver module 1102 is further configured to receive the first measurement collection result. The first measurement collection result is obtained by the CU-UP entity by performing the MDT measurement on the first measurement object.

Optionally, the processing module 1101 is further configured to determine second configuration information. The second configuration information is used by a distributed unit DU entity of the network device to perform an MDT measurement on a second measurement object. The transceiver module 1102 is further configured to send the second configuration information to the DU entity.

Optionally, the second configuration information includes one or more of the second measurement object, a granularity of the second measurement object, a second statistical period, or a manner of feeding back a second measurement collection result.

Optionally, the transceiver module 1102 is further configured to receive the second measurement collection result. The second measurement collection result is obtained by the DU entity by performing the MDT measurement on the second measurement object.

Optionally, the first entity is a centralized unit control plane CU-CP entity of the network device. The transceiver module 1102 is further configured to send third configuration information. The third configuration information is used by a terminal device to perform an MDT measurement on a third measurement object. The transceiver module 1102 is further configured to receive a third measurement collection result. The third measurement collection result is obtained by the terminal device by performing the MDT measurement on the third measurement object.

Optionally, the first entity is a centralized unit control plane CU-CP entity of the network device. The transceiver module 1102 is further configured to send third configuration information. The third configuration information is used by a terminal device to perform an MDT measurement on a third measurement object. The transceiver module 1102 is further configured to receive a third measurement collection result. The third measurement collection result is obtained by the terminal device by performing the MDT measurement on the third measurement object. The transceiver module 1102 is further configured to send the third measurement collection result to the CU-UP entity.

Optionally, the first entity is an MDT entity. The processing module 1101 is further configured to determine third configuration information. The third configuration information is used by a terminal device to perform an MDT measurement on a third measurement object. The transceiver module 1102 is further configured to send the third configuration information to a CU-CP entity. Then, the CU-CP entity sends the third configuration information to the terminal device.

Optionally, the transceiver module 1102 is further configured to receive a third measurement collection result. The third measurement collection result is obtained by the terminal device by performing the MDT measurement on the third measurement object.

Optionally, the third configuration information includes one or more of the third measurement object, a granularity of the third measurement object, a third statistical period, or a manner of feeding back the third measurement collection result.

All related content of the steps in the foregoing method embodiments may be cited in function descriptions of corresponding functional modules. Details are not described herein again.

In this embodiment, the first entity 110 is presented in a form of the functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the first entity 110 may be in a form shown in FIG. 5.

For example, the processor 501 in FIG. 5 may invoke the computer-executable instruction stored in the memory 503, to enable the first entity 110 to perform the MDT measurement method in the foregoing method embodiments.

Specifically, functions/implementation processes of the transceiver module 1102 and the processing module 1101 in FIG. 11 may be implemented by the processor 501 in FIG. 5 by invoking the computer-executable instruction stored in the memory 503. Alternatively, functions/implementation processes of the processing module 1101 in FIG. 11 may be implemented by the processor 501 in FIG. 5 by invoking the computer-executable instruction stored in the memory 503, and functions/implementation processes of the transceiver module 1102 in FIG. 11 may be implemented by the communications interface 504 in FIG. 5.

The first entity 110 provided in this embodiment can perform the foregoing MDT measurement method. Therefore, for a technical effect that can be achieved by the first entity 110, refer to descriptions in the foregoing method embodiments. Details are not described herein again.

In addition, if the communications apparatus is the network device, the terminal device, a first network device, or a second network device in the foregoing method embodiments, a schematic structural diagram of the communications apparatus is similar to a schematic structural diagram of the first entity shown in FIG. 11. A difference lies in, for example, that processing modules corresponding to different devices perform different operations, and transceiver modules corresponding to the different devices perform different operations. For details, refer to the descriptions of the structure of the first entity, and details are described herein again.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store a necessary program instruction and necessary data. Certainly, the communications apparatus may not include a memory. When the communications apparatus is a chip system, the communications apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the apparatus described above.

Although this application is described with reference to the embodiments, in a procedure of implementing this application that claims protection, a person skilled in the art may understand and implement another variation of the disclosed embodiments by viewing the accompanying drawings, disclosed content, and the accompanying claims. In the claims, "comprise" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A method comprising:
   determining, by a first entity, first configuration information, wherein the first configuration information comprises a first configuration of a first minimization of drive tests (MDT) measurement to be performed by a centralized unit user plane (CU-UP) entity of a network device on a first measurement object, the first configuration information indicating one or more of: a first granularity of the first measurement object or a first statistical period during which the first MDT measurement is to be performed; and sending, by the first entity, the first configuration information to the CU-UP entity.

2. The method according to claim 1, wherein the first configuration information further indicates one or more of: the first measurement object or a manner of feeding back a first measurement collection result of the first MDT measurement.

3. The method according to claim 1, wherein the method further comprises:

determining, by the first entity, second configuration information, wherein the second configuration information comprises a second configuration of a second MDT measurement to be performed by a distributed unit (DU) entity of the network device on a second measurement object; and sending, by the first entity, the second configuration information to the DU entity.

4. The method according to claim 3, wherein the second configuration information indicates one or more of: the second measurement object, a second granularity of the second measurement object, a second statistical period, or a second manner of feeding back a second measurement collection result.

5. The method according to claim 1, wherein the first entity is a central unit control plane (CU-CP) entity of the network device, and the method further comprises:

sending, by the CU-CP entity, third configuration information to a terminal device, wherein the third configuration information comprises a third configuration of a third MDT measurement to be performed by the terminal device on a third measurement object; and receiving, by the CU-CP entity from the terminal device, a third measurement collection result obtained based on the third configuration information.

6. The method according to claim 5, wherein the third configuration information indicates one or more of: the third measurement object, a third granularity of the third measurement object, a third statistical period, or a third manner of feeding back the third measurement collection result.

7. The method according to claim 1, wherein the first entity is a CU-CP entity of the network device, and the method further comprises:

sending, by the CU-CP entity, third configuration information to a terminal device, wherein the third configuration information comprises a third configuration of a third MDT measurement to be performed by the terminal device on a third measurement object;

receiving, by the CU-CP entity from the terminal device, a third measurement collection result obtained based on the third configuration information; and sending, by the CU-CP entity, the third measurement collection result to the CU-UP entity.

8. The method according to claim 1, wherein the first entity is an MDT entity, and the method further comprises:

determining, by the MDT entity, third configuration information, wherein the third configuration information comprises a third configuration of a third MDT measurement to be performed by a terminal device on a third measurement object; and sending, by the MDT entity, the third configuration information to the terminal device through a CU-CP entity.

9. The method according to claim 8, wherein the method further comprises:

receiving, by the MDT entity, a third measurement collection result obtained based on the third configuration information from the terminal device.

10. A communications apparatus, comprising:

a non-transitory memory storage comprising instructions; and one or more processors in communication with the non-transitory memory storage, wherein the instructions, when executed by the one or more processors, cause the communications apparatus to:

determine first configuration information, wherein the first configuration information comprises a first configuration of a first minimization of drive tests (MDT) measurement to be performed by a centralized unit user plane (CU-UP) entity of a network device on a first measurement object, the first configuration information indicating one or more of: a granularity of the first measurement object or a first statistical period during which the first MDT measurement is to be performed; and send the first configuration information to the CU-UP entity.

11. The communications apparatus according to claim 10, wherein the first configuration information further indicates one or more of: the first measurement object or a manner of feeding back a first measurement collection result of the first MDT measurement.

12. The communications apparatus according to claim 10, wherein the instructions, when executed by the one or more processors, cause the communications apparatus further to:

determine second configuration information, wherein the second configuration information comprises a second configuration of a second MDT measurement to be performed by a distributed unit (DU) entity of the network device on a second measurement object; and send the second configuration information to the DU entity.

13. The communications apparatus according to claim 12, wherein the second configuration information indicates one or more of: the second measurement object, a second granularity of the second measurement object, a second statistical period, or a second manner of feeding back a second measurement collection result.

14. The communications apparatus according to claim 10, wherein the communications apparatus is a central unit control plane (CU-CP) entity of the network device, and wherein the instructions, when executed by the one or more processors, cause the communications apparatus further to:

send third configuration information to a terminal device, wherein the third configuration information comprises a third configuration of a third MDT measurement to be performed by the terminal device on a third measurement object; and receive a third measurement collection result obtained based on the third configuration information from the terminal device.

15. The communications apparatus according to claim 14, wherein the instructions, when executed by the one or more processors, cause the communications apparatus further to:

send the third measurement collection result to the CU-UP entity.

16. The communications apparatus according to claim 14, wherein the third configuration information indicates one or more of: the third measurement object, a third granularity of the third measurement object, a third statistical period, or a third manner of feeding back the third measurement collection result.

17. A non-transitory computer-readable storage medium storing a program to be executed by one or more processors of an apparatus the program including instructions to cause the apparatus to perform operations including:

determining first configuration information, wherein the first configuration information comprises a first configuration of a first minimization of drive tests (MDT) measurement to be performed by a centralized unit user plane (CU-UP) entity of a network device on a first measurement object, the first configuration information indicating one or more of: a granularity of the first measurement object or a first statistical period during which the first MDT measurement is to be performed; and sending the first configuration information to the CU-UP entity.

18. The non-transitory computer-readable storage medium according to claim 17, wherein the first configuration information further indicates one or more of: the first measurement object or a manner of feeding back a first measurement collection result of the first MDT measurement.

19. The non-transitory computer-readable storage medium according to claim 17, the operations further comprising:

determining second configuration information, wherein the second configuration information comprises a second configuration of a second MDT measurement to be performed by a distributed unit (DU) entity of the network device on a second measurement object; and sending the second configuration information to the DU entity.

20. The non-transitory computer-readable storage medium according to claim 17, the operations further comprising:

sending third configuration information to a terminal device, wherein the third configuration information comprises a third configuration of a third MDT measurement to be performed by the terminal device on a third measurement object; and receiving a third measurement collection result obtained based on the third configuration information from the terminal device.

* * * * *